US011902861B2

(12) United States Patent
Donoghue et al.

(10) Patent No.: US 11,902,861 B2
(45) Date of Patent: Feb. 13, 2024

(54) SMS-BASED DUAL MODE CONTENT SUBSCRIPTION SYSTEM

(71) Applicant: Advance Local Media LLC, New York, NY (US)

(72) Inventors: Lawrence Donoghue, Montclair, NJ (US); Harris Novick, Mamaroneck, NY (US); Kevin Wong, Robbinsville, NJ (US); David Cohn, Berkeley, CA (US)

(73) Assignee: Advance Local Media LLC, New York, NY (US)

( * ) Notice: Subject to any disclaimer, the term of this patent is extended or adjusted under 35 U.S.C. 154(b) by 326 days.

(21) Appl. No.: 17/091,294

(22) Filed: Nov. 6, 2020

(65) Prior Publication Data

US 2021/0144520 A1 May 13, 2021

Related U.S. Application Data

(60) Provisional application No. 62/932,217, filed on Nov. 7, 2019.

(51) Int. Cl.
*H04W 4/06* (2009.01)
*H04W 4/14* (2009.01)
(Continued)

(52) U.S. Cl.
CPC .............. *H04W 4/14* (2013.01); *H04L 51/58* (2022.05); *H04W 4/06* (2013.01); *H04W 8/18* (2013.01); *H04W 88/184* (2013.01)

(58) Field of Classification Search
CPC ........... H04W 4/06; H04W 4/14; H04W 8/18; H04W 8/186; H04W 88/184; H04L 12/1859; H04L 51/58
See application file for complete search history.

(56) References Cited

U.S. PATENT DOCUMENTS

2009/0176511 A1* 7/2009 Morrison .............. H04W 4/029
455/456.3
2010/0269028 A1* 10/2010 Othmer ................. H04W 4/185
715/205
(Continued)

OTHER PUBLICATIONS

"A large scale publish-subscribe platform for information delivery to mobile phones"; Thejovardhana S. Kote; Jun. 27, 2008 (Year: 2008).*

*Primary Examiner* — Lester G Kincaid
*Assistant Examiner* — Dung L Lam
(74) *Attorney, Agent, or Firm* — Dority & Manning, P.A.

(57) ABSTRACT

An SMS-based dual mode content subscription system is disclosed. A first broadcast message associated with a subscription content source is received. A set of destination SMS addresses is determined, each destination SMS address associated with a different subscription to the subscription content source and corresponding to a different mobile device. An SMS message that includes the first broadcast message is sent to each destination SMS address, the SMS message identifying a same first sender SMS address. A reply SMS message is received from a first mobile device of a plurality of mobile devices, the reply SMS message being directed to the first sender SMS address and not being distributed to any other mobile device of the plurality of mobile devices. In response to the reply SMS message, a second SMS message that includes a first subscriber message is sent to only the first mobile device.

11 Claims, 19 Drawing Sheets

(51) Int. Cl.
*H04W 88/18* (2009.01)
*H04W 8/18* (2009.01)
*H04L 51/58* (2022.01)

(56) References Cited

U.S. PATENT DOCUMENTS

| | | | |
|---|---|---|---|
| 2011/0143784 A1* | 6/2011 | Ahluwalia | H04W 4/12 |
| | | | 455/466 |
| 2012/0220259 A1* | 8/2012 | Sennett | H04W 4/024 |
| | | | 455/404.2 |
| 2013/0290449 A1* | 10/2013 | Norby | G06F 21/6263 |
| | | | 709/206 |
| 2014/0050137 A1* | 2/2014 | Alberth, Jr. | H04W 4/06 |
| | | | 370/312 |
| 2016/0241507 A1* | 8/2016 | Helbling | H04L 12/18 |

* cited by examiner

| INBOX | BROADCASTS | SUBSCRIBERS | CAMPAIGN | ANALYTICS |
| 64-1 | 64-2 | 64-3 | 64-4 | 64-5 |

ALL MESSAGES | BOB JOHNSON (555)134-1234
UNREAD (2)
SENT
TEMPLATE

OCT 21
SPREAD OUT OVER A DAY IT ISN'T TOO BAD, GIVE IT A SHOT!

OCT 21
SOUNDS LIKE A LOT OF WATER!

OCT 21
HYDRATION IS IMPORTANT! TRY TO DRINK 15 CUPS OF WATER A DAY. YOU'LL FEEL BETTER!

OCT 20
ISN'T THAT THE TRUTH

OCT 20
CARDIO IS AS IMPORTANT AS RESISTANCE TRAINING

SEND

SMS-BASED DUAL MODE CONTENT SUBSCRIPTION SYSTEM

RELATED APPLICATION

This application claims the benefit of U.S. Provisional Application No. 62/932,217, filed on Nov. 7, 2019, entitled "SMS-BASED DUAL MODE CONTENT SUBSCRIPTION SYSTEM," the disclosure of which is hereby incorporated herein by reference in its entirety.

BACKGROUND

Online interactive platforms provide users with content, such as news or other articles of interest. Such platforms may also provide an ability for users to post their thoughts or comments on the content. A user may seek additional information from the source of the content or seek a dialogue with the source of the content, which may be facilitated by submitting a post. However, typically such posts are viewable by all other users, and as the number of users increases, it is increasingly unlikely that the source of the content can or will respond to the post just due to the sheer number of posts.

Often such online interactive platforms provide a mobile application that runs on a mobile device platform, such as a smartphone. In order to see if new content has been provided by the source, the user intermittently executes the mobile application to see if new content has been posted. This can be time-consuming, and each online interactive platform has a separate mobile application, requiring a user to cycle through multiple different mobile applications.

SUMMARY

The embodiments disclosed herein relate to an SMS-based dual mode content subscription system that allows subscribers who subscribe to a subscription content source to receive new content via a text messaging service (e.g., short-message service (SMS)) when the content is posted. A host of the subscription content source can send a broadcast SMS message to a set of subscribers via SMS using a same sender SMS address, but a reply SMS message made by any subscriber to the broadcast message is only sent to the sender SMS address and not to any other recipients of the broadcast SMS message.

In one embodiment a method is provided. The method includes receiving, by a computing device, a first broadcast message associated with a first subscription content source of a plurality of subscription content sources. The method further includes determining, by the computing device, a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices. The method further includes causing, by the computing device, a first SMS message that includes the first broadcast message to be sent via at least one cellular network to each destination SMS address in the first set of destination SMS addresses, the first SMS message identifying a same first sender SMS address. The method further includes receiving, from a first mobile device of the plurality of mobile devices, a reply SMS message made in response to the first SMS message received by the first mobile device, the reply SMS message being directed to the first sender SMS address and not being distributed to any other mobile device of the plurality of mobile devices. The method further includes, in response to the reply SMS message, causing, by the computing device, a second SMS message that includes a first subscriber message to be sent to only the first mobile device via the at least one cellular network.

In another embodiment a computing system is provided. The computing system includes one or more memories and one or more processor devices coupled to the one or more memories. The one or more processor devices are configured to receive a first broadcast message associated with a first subscription content source of a plurality of subscription content sources. The one or more processor devices are further configured to determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices. The one or more processor devices are further configured to cause a first SMS message that includes the first broadcast message to be sent via at least one cellular network to each destination SMS address in the first set of destination SMS addresses, the first SMS message identifying a same first sender SMS address. The one or more processor devices are further configured to receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices. The one or more processor devices are further configured to, in response to the reply SMS message, cause a second SMS message that includes a first subscriber message to be sent to only the first mobile device via the at least one cellular network.

In another embodiment a computer program product is provided. The computer program product is stored on a non-transitory computer-readable storage medium and includes instructions configured to cause one or more processor devices to receive a first broadcast message associated with a first subscription content source of a plurality of subscription content sources. The instructions are further configured to cause the one or more processor devices to determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices. The instructions are further configured to cause the one or more processor devices to cause a first SMS message that includes the first broadcast message to be sent via at least one cellular network to each destination SMS address in the first set of destination SMS addresses, the first SMS message identifying a same first sender SMS address. The instructions are further configured to cause the one or more processor devices to receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices. The instructions are further configured to cause the one or more processor devices to, in response to the reply SMS message, cause a second SMS message that includes a first subscriber message to be sent to only the first mobile device via the at least one cellular network.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4D illustrates the updating of the user interface imagery illustrated in FIG. 4A to reflect the subscriber message sent to the subscriber according to one embodiment;

FIGS. 8A-8G illustrate user interface imagery and functionality associated with a web page module of the SMS-based dual mode content subscription system that is configured to facilitate subscribing to a subscription content source according to one embodiment;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The embodiments disclosed herein relate to an SMS-based dual mode content subscription system that allows subscribers who subscribe to a subscription content source to receive new content via a text messaging service (e.g., short-message service (SMS)) when the content is posted. A host of the subscription content source can send a broadcast SMS message to a set of subscribers via SMS using a same sender SMS address, but a reply SMS message made by any subscriber to the broadcast message is only sent to the sender SMS address and not to any other recipients of the broadcast SMS message.

The host may respond to any subscriber individually, such that only the designated subscriber receives the message. Among other advantages, the disclosed embodiments allow subscribers to subscribe to subscription content sources that provided desired content, and receive new content without a need to iteratively access a portal. The embodiments also allow the host to engage in 1:M communications with subscribers, or in 1:1 communications with any individual subscriber, while the subscribers can only engage in 1:1 communications with the host.

Figure 1A:
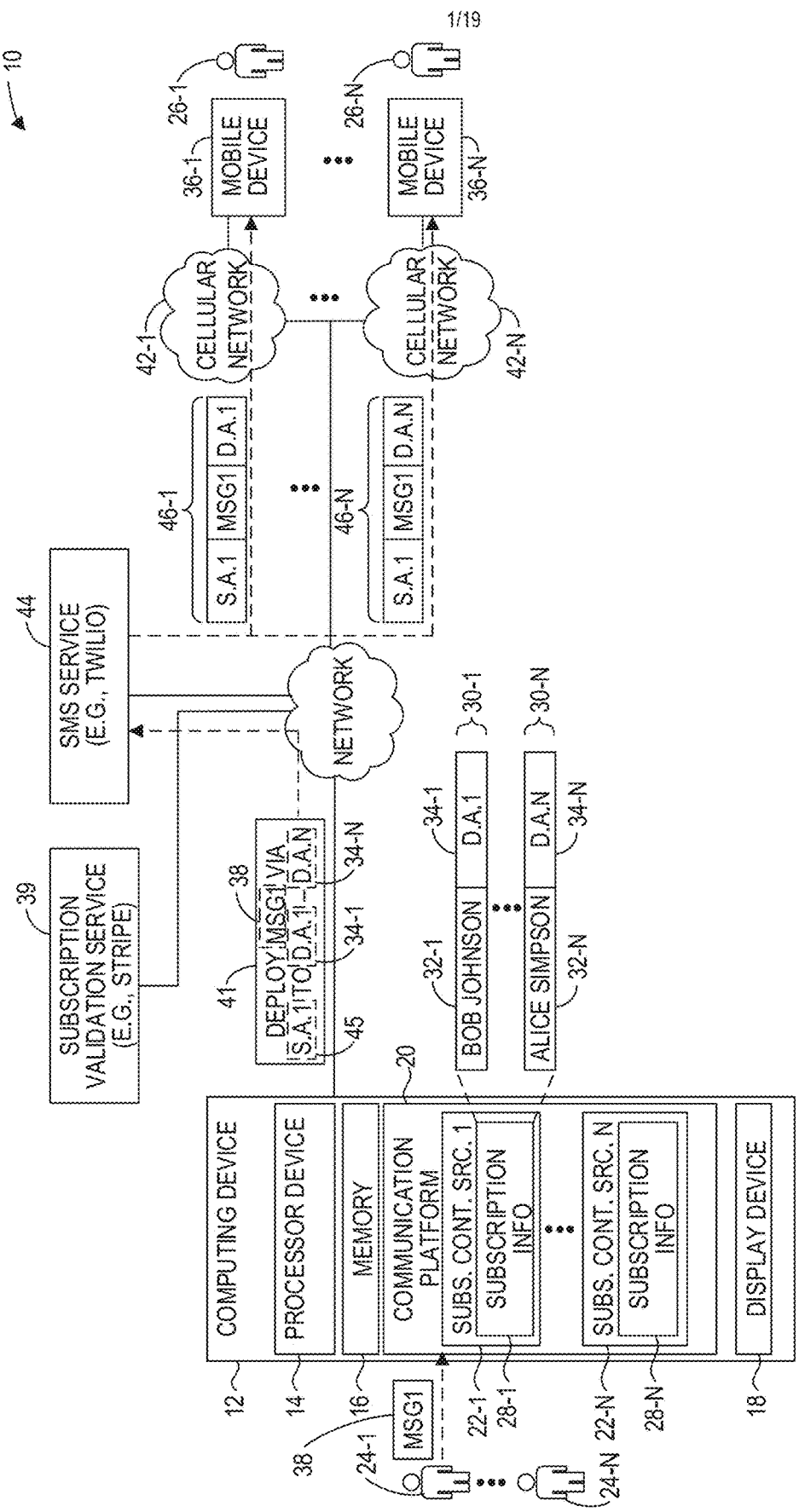
FIG. 1A is a block diagram of an SMS-based dual mode content subscription system according to one embodiment.

FIG. 1A is a block diagram of an environment 10 which includes an SMS-based dual mode content subscription system according to one embodiment. The environment 10 includes a computing device 12, which in turn includes a processor device 14 coupled to a memory 16 and a display device 18. The memory 16 includes a communication platform 20 which implements aspects of an SMS-based dual mode content subscription system as described herein. Because the communication platform 20 is a component of the computing device 12, functionality implemented by the communication platform 20 may be attributed to the computing device 12 generally. Moreover, in examples where the communication platform 20 comprises software instructions that program the processor device 14 to carry out functionality discussed herein, functionality implemented by the communication platform 20 may be attributed herein to the processor device 14.

The communication platform 20 facilitates the creation and management of a plurality of subscription content sources 22-1-22-N (generally, subscription content sources 22). Each of the subscription content sources 22-1-22-N may be associated with a particular host (e.g., content producer) 24-1-24-N (generally, hosts 24), and may be associated with a particular topic, such as a sports topic, a gaming topic, a travel topic, or any other topic which may be of interest to a subscriber 26-1-26-N (generally, subscribers 26).

Each subscription content source 22 has corresponding data structures that contain a variety of information, as described in greater detail below, that includes, by way of non-limiting example, subscription information data structures 28-1-28-N. The subscription information data structure 28-1, for example, includes a plurality of subscriber records 30-1-30-N, each of which corresponds to a different subscription associated with a subscriber 26 who has subscribed to the subscription content source 22-1. In this example, each record 30-1-30-N contains a name 32-1-32-N of the corresponding subscriber 26, and an SMS address 34-1-34-N (D.A.1-D.A.N) that identifies an SMS address, such as a 10-digit phone number, of a mobile device 36-1-36-N that corresponds to the subscriber 26-1-26-N. For purposes of illustration, in this example, the record 30-1 corresponds to the subscriber 26-1 and the mobile device 36-1, and the record 30-N corresponds to the subscriber 26-N and the mobile device 36-N. Thus, it may be stated herein that the name 32-1, the SMS address 34-1, the mobile device 36-1, and the subscriber 26-1 all correspond to one another. Similarly, it may be stated herein that the name 32-N, the SMS address 34-N, the mobile device 36-N, and the subscriber 26-N all correspond to one another.

Note that the subscribers 26 who subscribe to the subscription content source 22-1 may be the same or completely different subscribers 26 who subscribe to the subscription content source 22-N. Note also that, although, for purposes of illustration, only two subscribers 26 are illustrated, a subscription content source 22 may have tens, hundreds, or thousands of subscribers 26.

Assume for purposes of illustration that the host 24-1 desires to send a broadcast message to the subscribers 26 who subscribe to the subscription content source 22-1. The host 24-1 interacts with the communication platform 20 via a computing device (not illustrated), and via the computing device, the host 24-1 provides a broadcast message 38 to the communication platform 20 via a user interface that will be discussed in greater detail below. The communication platform 20 receives the broadcast message 38 from the host 24-1, who has entered appropriate authentication information that identifies her as a host 24 associated with the subscription content source 22-1. The broadcast message 38 may comprise, for example, an article that provides health care advice, a link to such an article, or the like. The communication platform 20 accesses the subscription information data structure 28-1 to determine a set of destination SMS addresses 34 associated with subscribers 26 who have subscribed to the subscription content source 22-1.

In some embodiments, the communication platform 20 may access a subscription validation service 39 that maintains a subscriber status for each subscriber 26 to ensure that each subscriber 26 is still a subscriber. In some embodiments, the subscription validation service 39 may comprise an online payment processing service, such as, by way of non-limiting example, Stripe®. If a subscriber 26 is no longer a subscriber, the communication platform 20 will remove the SMS address 34 that corresponds to the subscriber 26 from the set of destination SMS addresses 34.

The communication platform 20 then causes an SMS message that includes the broadcast message 38 to be sent to the mobile devices 36-1-36-N that correspond to the set of destination SMS addresses 34. The SMS message is delivered to each of the mobile devices 36-1-36-N via one or more cellular networks 42-1-42-N.

In one example, the communication platform 20 causes the SMS message to be sent to the mobile devices 36-1-36-N via an SMS service 44, such as, by way of non-limiting example, Twilio®, or the like. In such example, the communication platform 20 sends instructions 41 to the SMS service 44 to send the broadcast message 38 to the destination SMS addresses 34-1-34-N from a particular sender SMS address 45 (e.g., S.A.1). The sender SMS address 45 may comprise a long code (i.e., 10 digit) telephone number associated with the subscription content source 22-1. The SMS service 44 then generates and sends individual SMS messages 46-1-46-N, each of which includes the broadcast message 38, to each of the mobile devices 36-1-36-N via the corresponding SMS addresses 34-1-34-N. Each SMS message 46 is sent from the same sender SMS address 45, such that any reply SMS message to the SMS messages 46-1-46-N by one or more subscribers 26-1-26-N is routed to the communication platform 20, and any such reply SMS messages do not go to the other subscribers 26-1-26-N.

Figure 1B:
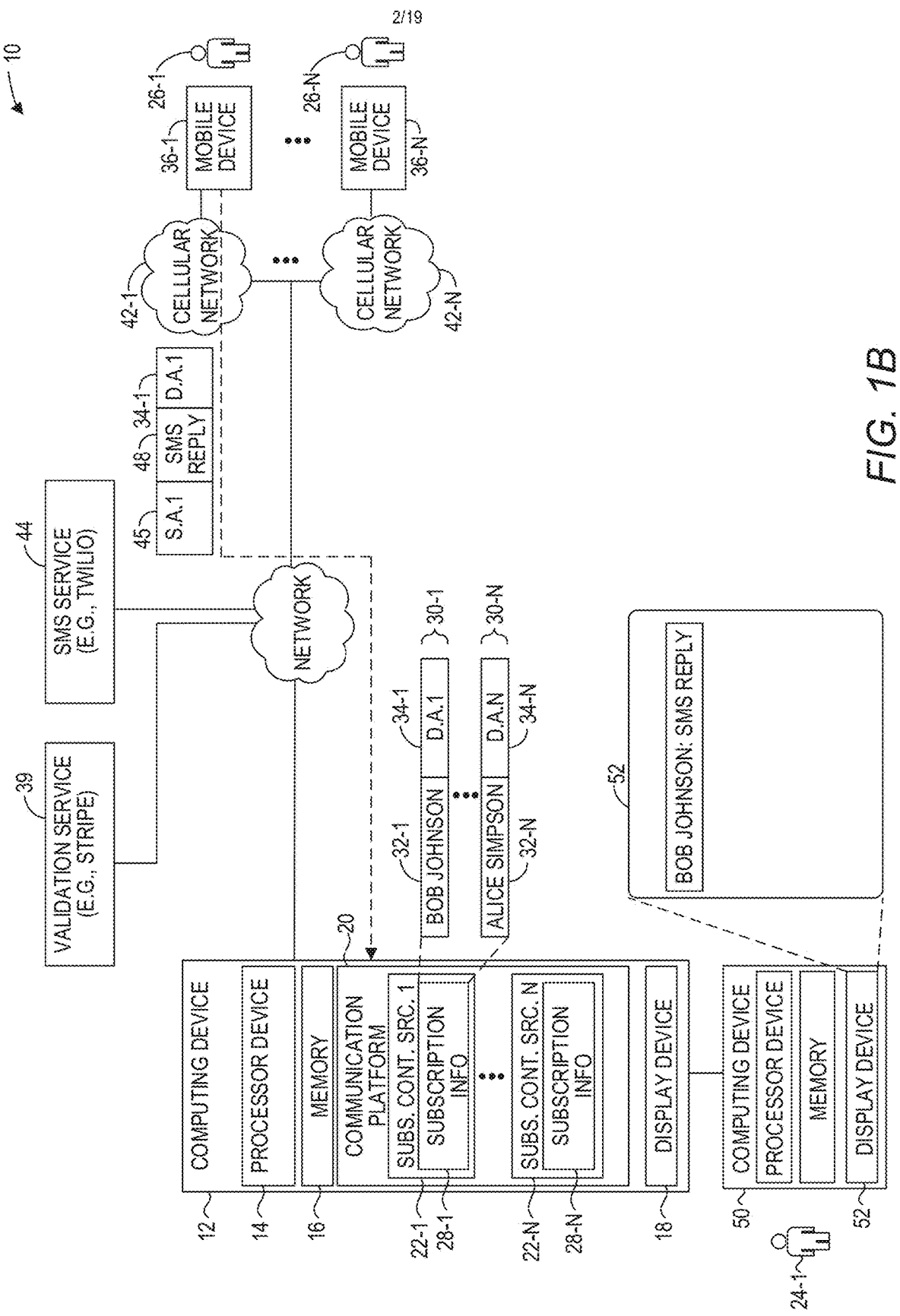
FIG. 1B is a block diagram of the environment illustrated in FIG. 1A illustrating an SMS reply message from a subscriber to a broadcast message from a host according to one embodiment.

Referring now to FIG. 1B, assume that the subscriber 26-1 sends a reply SMS message 48 in response to receiving the SMS message 46-1. The reply SMS message 48 includes the SMS address 34-1 of the mobile device 36-1 as the sender SMS address and includes the sender SMS address 45 of the SMS message 46-1 as the destination SMS address, and the reply SMS message 48 is sent to the communication platform 20 for processing. In some embodiments, the sender SMS address 45 may be identified as being associated with the SMS service 44, and the cellular network 42-1 may deliver the reply SMS message 48 to the SMS service 44. The SMS service 44 may then communicate the reply SMS message 48 to the communication platform 20.

The communication platform 20 determines that the reply SMS message 48 is associated with the subscription content source 22-1, and delivers the reply SMS message 48 to an inbox associated with the subscription content source 22-1, as will be discussed in greater detail below. The host 24-1 utilizes a computing device 50 to interact with the communication platform 20. In some embodiments, the interaction may be via a web browser. In other embodiments, the interaction may be by a separate application installed on the computing device 50. The host 24-1 accesses the communication platform 20 via the computing device 12 and may then view the reply SMS message 48 on a display device 52.

Figure 1C:
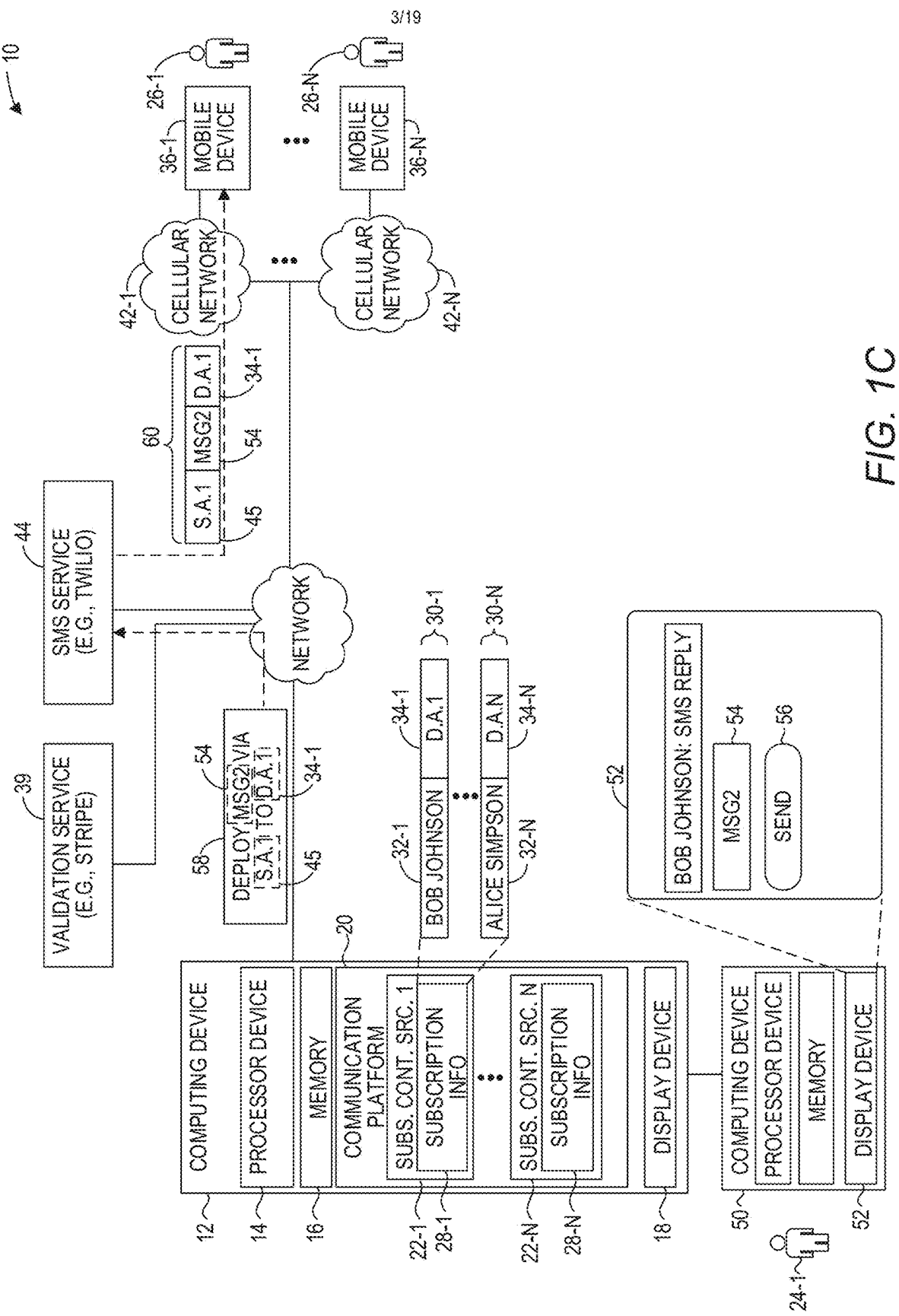
FIG. 1C is a block diagram of the environment illustrated in FIG. 1B illustrating the host sending the subscriber a subscriber message in response to the SMS reply message from the subscriber.

Referring now to FIG. 1C, the host 24-1 composes a subscriber message 54 in response to the reply SMS message 48 of the subscriber 26-1. When finished, the host 24-1 activates a send control 56. The communication platform 20 sends instructions 58 that include the subscriber message 54 and the SMS address 34-1 of the subscriber 26-1 to the SMS service 44 to cause an SMS message 60 that includes the subscriber message 54 to be sent to the mobile device 36-1 via the cellular network 42-1. Note that the subscriber message 54 is not sent to any other subscriber 26.

The SMS-based dual mode content subscription system facilitates broadcast distribution of content to a plurality of mobile devices 36, and also allows for individual communications between a host 24 and any subscriber 26. A subscriber 26 can subscribe to one or more particular subscription content sources 22-1-22-N based on the interests of the subscriber 26, and have new content proactively sent to the mobile device 36 of the subscriber 26 without a need to repeatedly access a website or other content source, and without a need to analyze an abundance of content to separate undesired content from desired content. The embodiments also allow for one-on-one communications between a subscriber 26 and the host 24 utilizing a common and convenient communication interface, SMS messaging.

Figure 2:
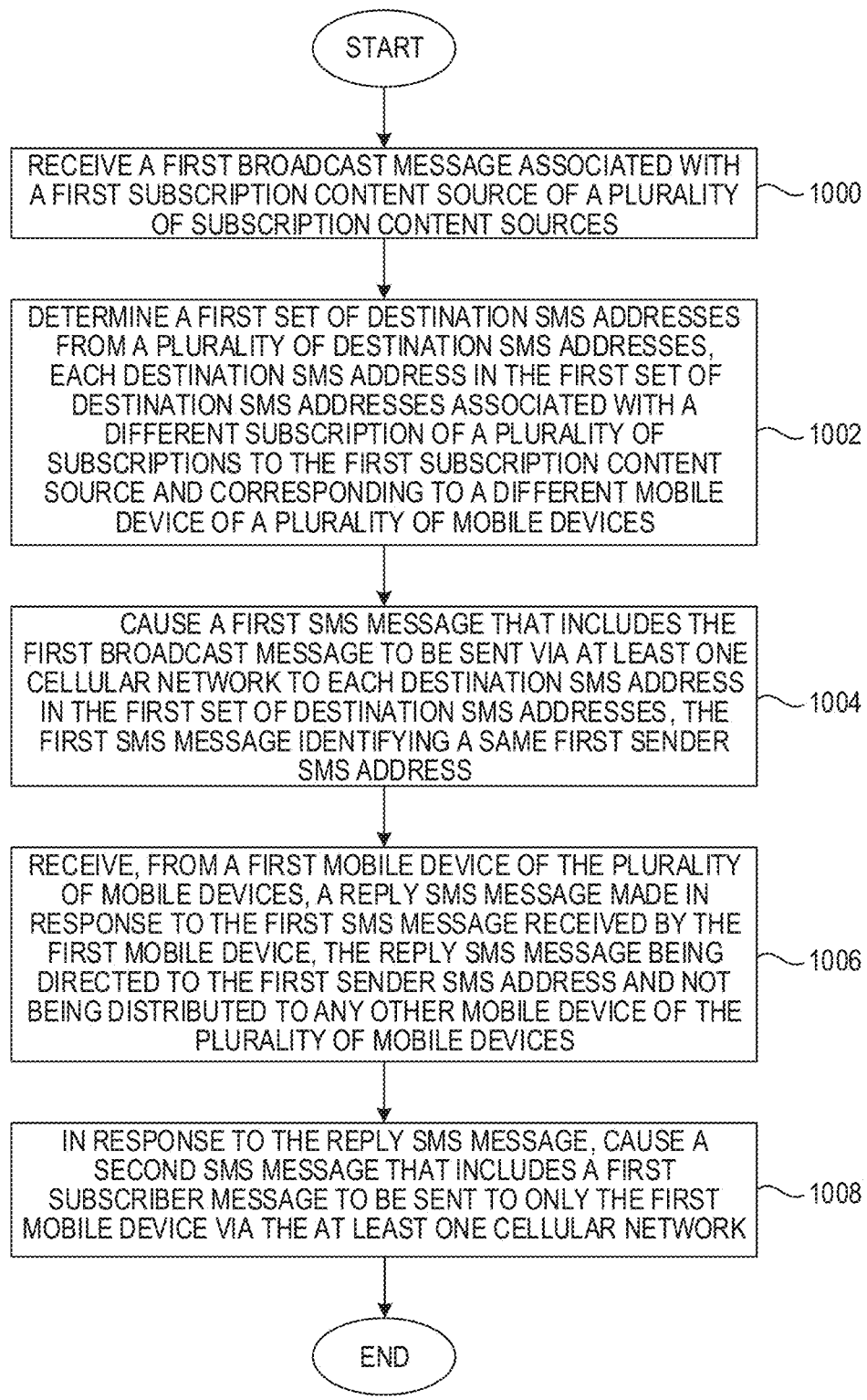
FIG. 2 is a flowchart of a method implemented by an SMS-based dual mode content subscription system according to one embodiment.

FIG. 2 is a flowchart of a method implemented by an SMS-based dual mode content subscription system according to one embodiment. FIG. 2 will be discussed in conjunction with FIGS. 1A-1C. The computing device 12 receives the broadcast message 38 associated with the subscription content source 22-1 of the plurality of subscription content sources 22-1-22-N (FIG. 2, block 1000). The computing device 12 determines the set of destination SMS addresses 34-1-34-N from the plurality of destination SMS addresses 34-1-34-N, each destination SMS address 34 in the set of destination SMS addresses 34-1-34-N associated with a different subscription of a plurality of subscriptions to the subscription content source 22-1 and corresponding to a different mobile device 36-1-36-N of the plurality of mobile devices 36-1-36-N (FIG. 2, block 1002). In this example, the set of destination SMS addresses 34-1-34-N comprises all of the potential destination SMS addresses 34-1-34-N. In other embodiments, as discussed in greater detail below, the set of destination SMS addresses 34 that are determined may be a subset of all potential destination SMS addresses 34-1-34-N.

The computing device 12 causes SMS messages 46-1-46-N that include the broadcast message 38 to be sent via the cellular networks 42-1-42-N to each destination SMS address 34-1-34-N in the set of destination SMS addresses 34-1-34-N, the SMS messages 46-1-46-N identifying the same sender SMS address 45 (FIG. 2, block 1004). The computing device 12 receives, from the mobile device 36-1 of the plurality of mobile devices 36-1-36-N, the reply SMS message 48 made in response to the SMS message 46-1 received by the mobile device 36-1, the reply SMS message 48 being directed to the sender SMS address 45 and not being distributed to any other mobile device 36 of the plurality of mobile devices 36-1-36-N (FIG. 2, block 1006). The computing device 12, in response to the reply SMS message 48, causes the second SMS message 60 that includes the first subscriber message 54 to be sent to only the mobile device 36-1 via the cellular network 42-1 (FIG. 2, block 1008).

Figure 3A:
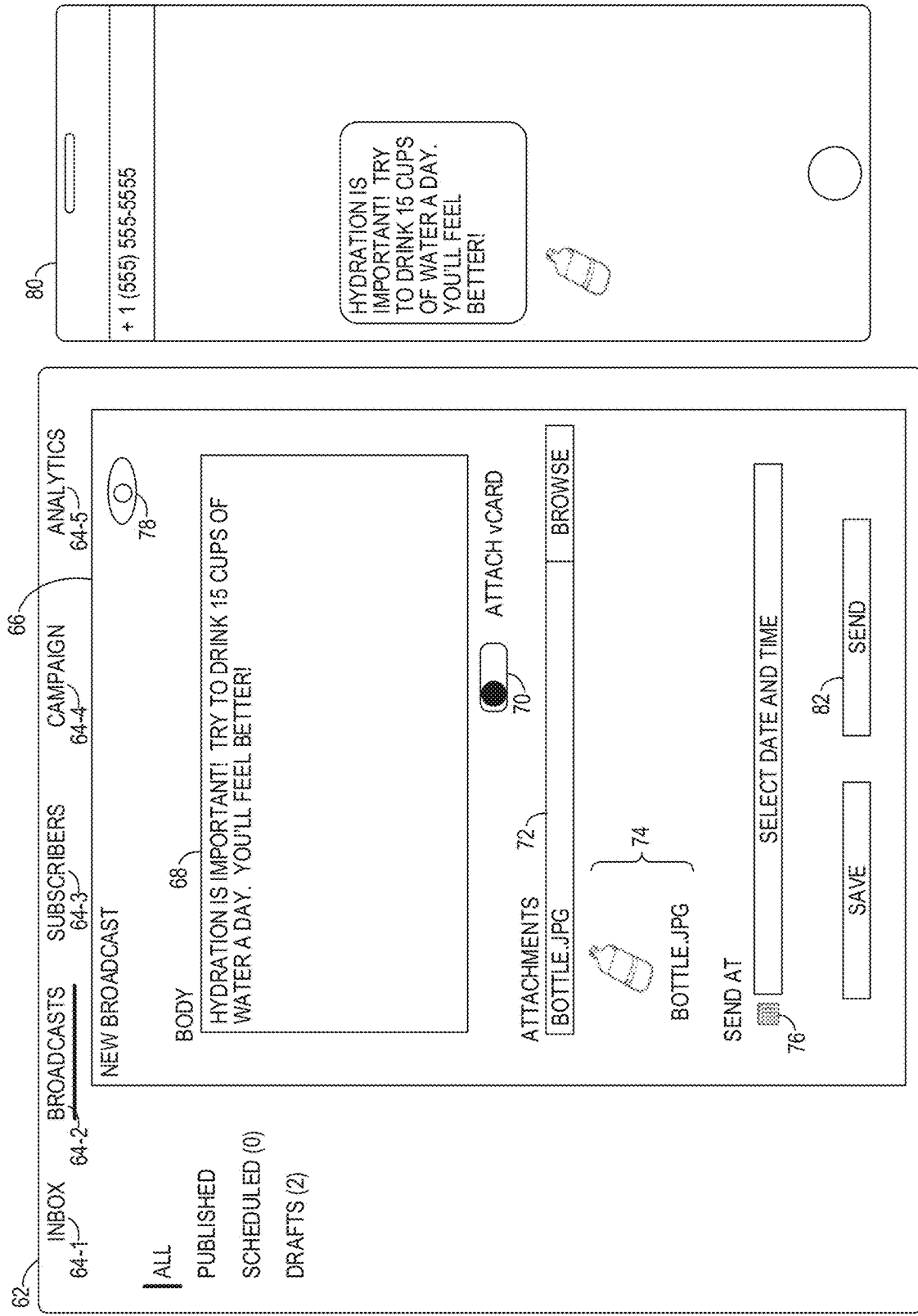
FIG. 3A illustrates user interface imagery that may be utilized by the host to send a broadcast message to subscribers according to one embodiment.

FIG. 3A illustrates user interface imagery 62 that may be utilized by the host 24-1 to send the broadcast message 38 to the subscribers 26-1-26-N according to one embodiment. It is noted that the user interface imagery 62 and other user interface imagery discussed herein is generated by the communication platform 20, either by a component that executes on the computing device 12 or a component that executes on the computing device 50 (FIG. 1C). In some embodiments, the host 24-1 interacts with the communication platform 20 on the computing device 12 via a web browser executing on the computing device 50. In response to inputs, the communication platform 20 may respond to the browser with one or more web pages that, when rendered by the computing device 50, result in the user interface imagery illustrated herein.

Figure 3B:
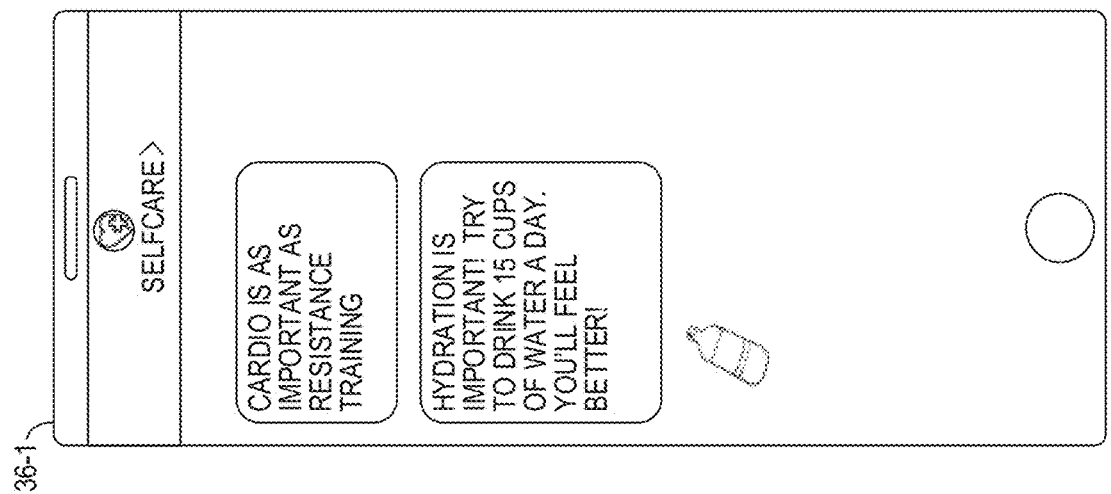
FIG. 3B is a diagram of a mobile device after an SMS message has been delivered to the mobile according to one embodiment.

The user interface imagery 62 provides a plurality of tabs 64-1-64-5, each of which corresponds to a different aspect of the SMS-based dual mode content subscription system. In this example, the host 24-1 has selected the broadcast tab 64-2 in order to generate the broadcast message 38. In response, the computing device 50 presents a broadcast window 66 on the display device 52. The broadcast window 66 includes a message control 68 into which the host 24-1 may enter text and/or a uniform resource identifier (URI). The broadcast window 66 includes a vcard control 70 which, if activated, will cause the communication platform 20 to include a vcard of the host 24-1 in the broadcast message 38-1. The broadcast window 66 includes an attachment control 72 that allows the host 24-1 to specify a file as an attachment. In this example, the host 24-1 has selected a file containing an image 74. The broadcast window 66 includes a calendar 76 via which the host 24-1 can select a date and time in the future at which the communication platform 20 should send the broadcast message 38 to the subscribers 26-1-26-N. The broadcast window 66 includes a preview control 78 which, if selected by the host 24-1, causes the communication platform 20 to generate and present preview imagery 80 illustrating how the broadcast message 38 will appear on a mobile device 36. When the host 24-1 has completed the broadcast message 38, the host 24-1 may select a send control 82. FIG. 3B is a diagram of the mobile device 36-1 after the SMS message 46-1 has been delivered to the mobile device 36-1.

Figure 4A:
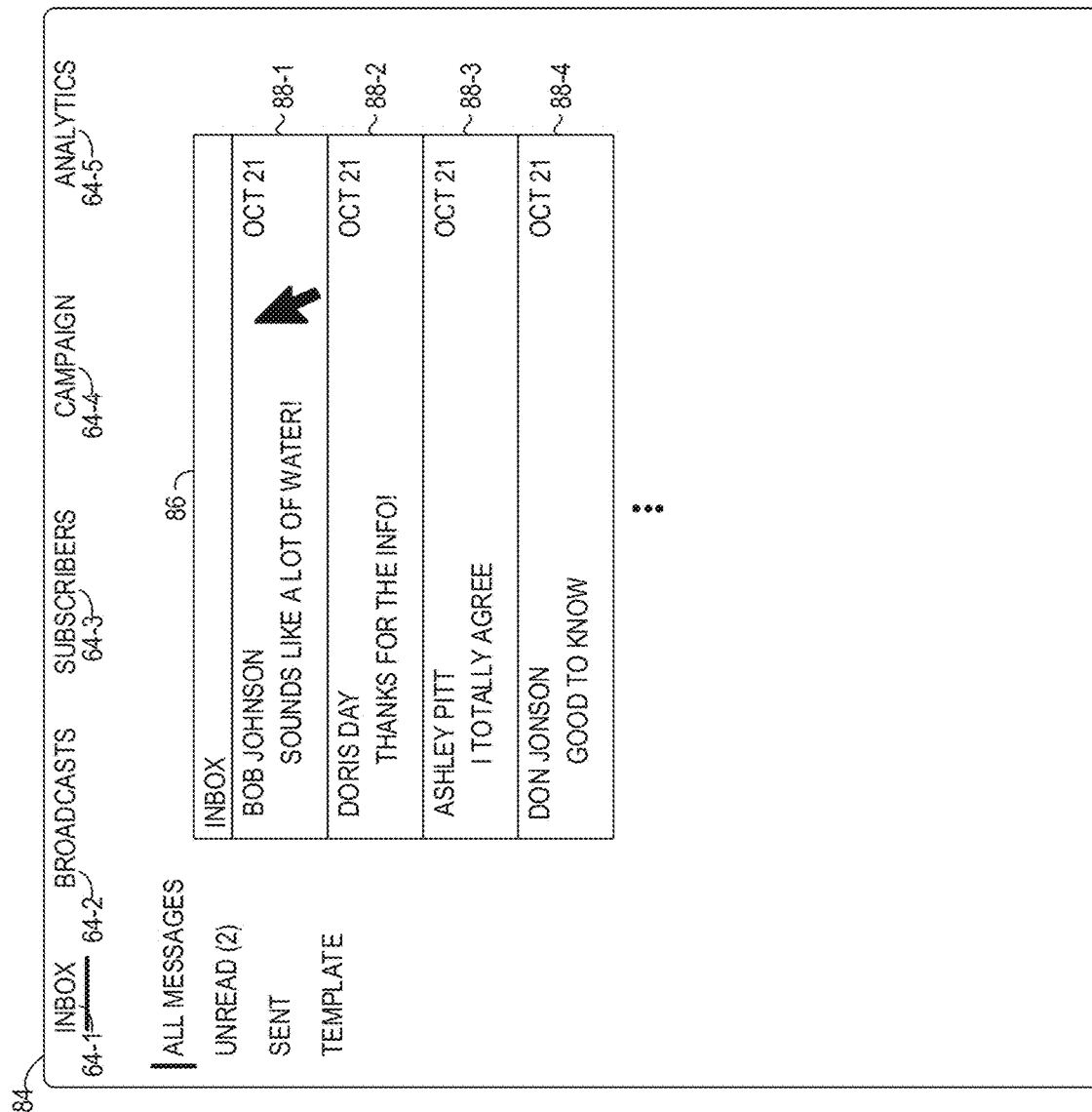
FIG. 4A illustrates user interface imagery that may be utilized by the host to view reply SMS messages sent by one or more of the subscribers according to one embodiment.

FIG. 4A illustrates user interface imagery 84 that may be utilized by the host to view reply SMS messages sent by one or more of the subscribers 26 according to one embodiment. In this example, the host 24-1 has selected the inbox tab 64-1 in order to view the inbox of the subscription content source 22-1. In response, the computing device 50 presents an inbox window 86 that contains a plurality of inbox SMS reply messages 88-1-88-4 sent by subscribers 26. Each inbox SMS reply message 88-1-88-4 identifies the subscriber 26, either by name or by phone number, and contains the text of the corresponding SMS reply message sent by the subscriber 26. In this example, the host 24-1 selects the inbox SMS reply message 88-1 in order to view the communications between the host 24-1 and the subscriber 26-1.

Figure 4B:
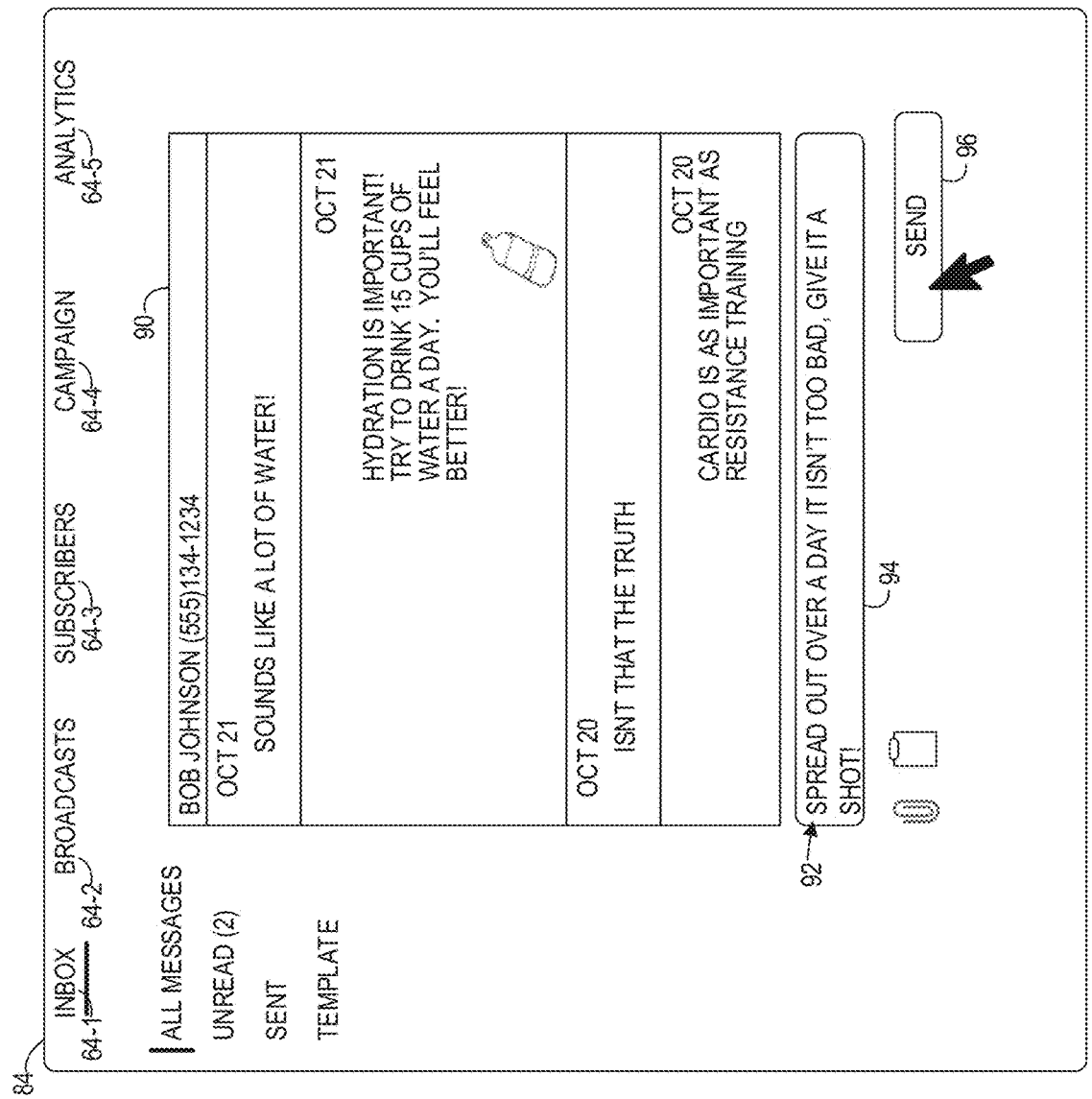
FIG. 4B illustrates a subscriber communications window via which a host can generate a subscriber message according to one embodiment.

Referring to FIG. 4B, in response to the selection of the inbox SMS reply message 88-1, the computing device 50 presents a subscriber communications window 90. The subscriber communications window 90 presents, in chronological order, the communications between the host 24-1 and the subscriber 26-1. Assume that the host 24-1 desires to respond to the subscriber 26-1. The host 24-1 may enter a subscriber message 92 in a message control 94, and when the subscriber message 92 is complete, select a send control 96 to cause an SMS message that includes the subscriber message 92 to be sent to the mobile device 36-1 of the subscriber 26-1. In response, the communication platform 20 sends an instruction to the SMS service 44 that causes the SMS service 44 to generate and send an SMS message to the mobile device 36-1 that contains the subscriber message 92, and that identifies the sender SMS address 45 as the source of the SMS message. Note that the subscriber message 92 is not sent to any other mobile device 36.

Figure 4C:
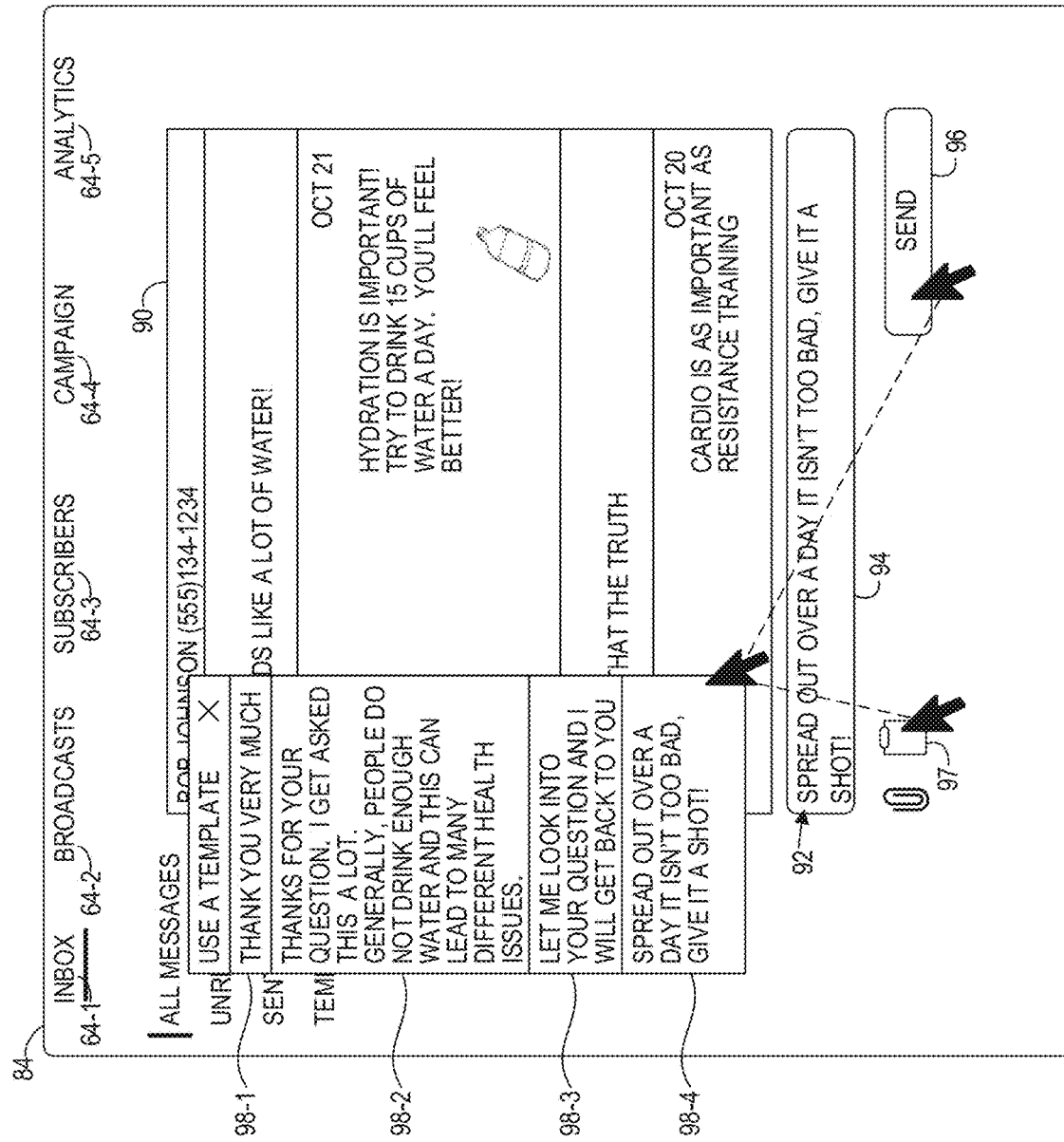
FIG. 4C illustrates a subscriber communications window via which a host can generate a subscriber message according to another embodiment.

FIG. 4C illustrates an alternate mechanism for the host 24-1 to enter the subscriber message 92 into the message control 94, according to one embodiment. In this embodiment, the host 24-1 selects a template control 97 to cause the presentation of a plurality of template responses 98-1-98-4. The template responses 98-1-98-4 are pre-generated responses of the host 24-1. For example, after receiving a same question from several subscribers 26, the host 24-1 may generate a template response 98 that answers the question. In this example, the host 24-1 selects the template response 98-4, which then causes the template response 98-4 to be inserted into the message control 94. The host 24-1 may then select the send control 96.

Referring now to FIG. 4D, the computing device 50 updates the subscriber communications window 90 to reflect the subscriber message 92 from the host 24-1 to the subscriber 26-1.

Figure 5:
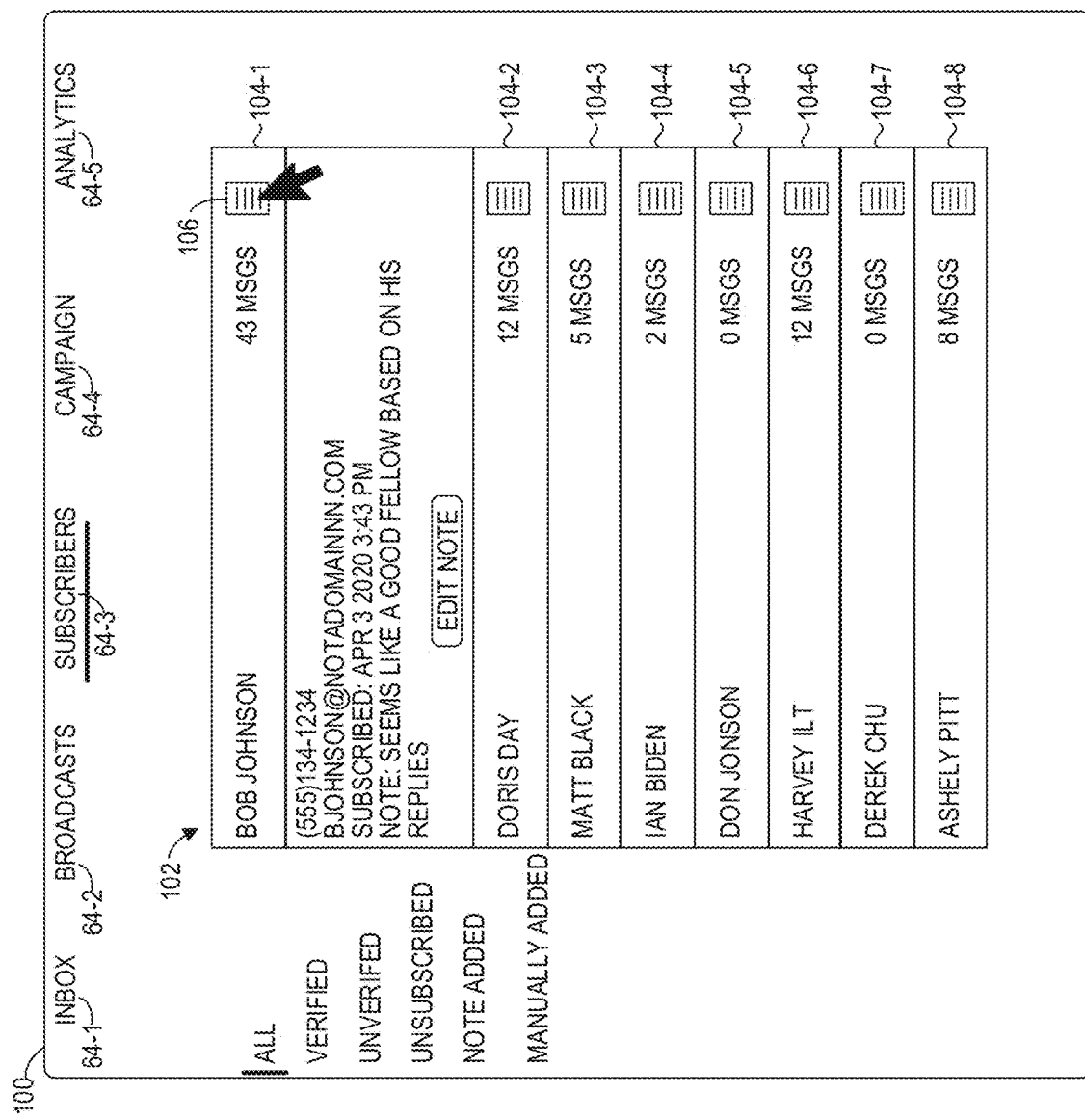
FIG. 5 illustrates user interface imagery that may be utilized by the host to review subscriber information of the subscribers of the subscription content source according to one embodiment.

FIG. 5 illustrates user interface imagery 100 that may be utilized by the host 24-1 to review subscriber information of the subscribers 26 of the subscription content source 22-1 according to one embodiment. The user interface imagery 100 provides the plurality of tabs 64-1-64-5, and in this example, the host 24-1 has selected the subscribers tab 64-3. In response, the computing device 50 presents a subscriber window 102 that identifies the subscribers 26 of the subscription content source 22-1 via a plurality of subscriber entries 104-1-104-8. The subscriber window 102 may be scrollable depending on the number of subscribers 26. Each subscriber entry 104 corresponds to a particular subscriber 26, and identifies the subscriber 26 and the number of SMS reply messages sent by the subscriber 26. Each subscriber entry 104 includes a detail control 106. In this example the host 24-1 has selected the detail control 106 associated with the subscriber 26-1 (Bob Johnson). In response, the subscriber window 102 expands to provide subscriber details about the subscriber 26-1, such as the telephone number of the mobile device 36-1 associated with the subscriber 26-1, an email address of the subscriber 26-1, and a date on which the subscriber 26-1 subscribed to the subscription content source 22-1. In this example, the host 24-1 previously entered a note ("seems like a good fellow based on his replies") into the subscriber details.

Figure 6A:
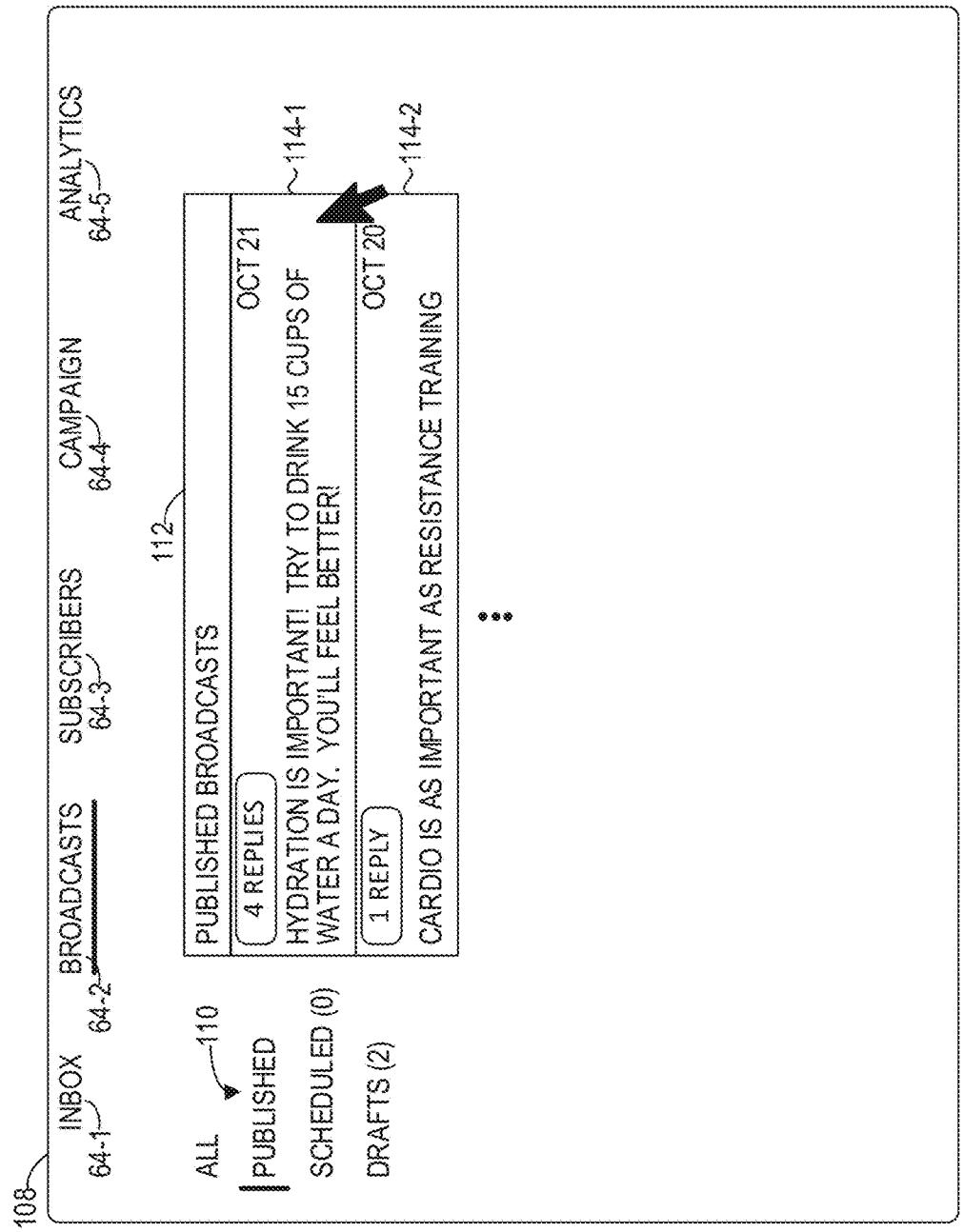
FIG. 6A illustrates user interface imagery that may be utilized by the host to view published broadcast messages.

FIG. 6A illustrates user interface imagery 108 that may be utilized by the host 24-1 to view published broadcast messages. The user interface imagery 108 provides the plurality of tabs 64-1-64-5. In this example, the host 24-1 has selected the broadcast tab 64-2, and then selected a published control 110. In response, the computing device 50 generates a published broadcasts window 112 that contains entries 114-1-114-2 that each correspond to each previous broadcast SMS message sent by the host 24-1. Each entry 114 contains the corresponding broadcast SMS message, and the number of reply SMS messages that were sent by subscribers 26 in response to the corresponding broadcast SMS message. In this example, the host 24-1 selects the entry 114-1.

Figure 6B:
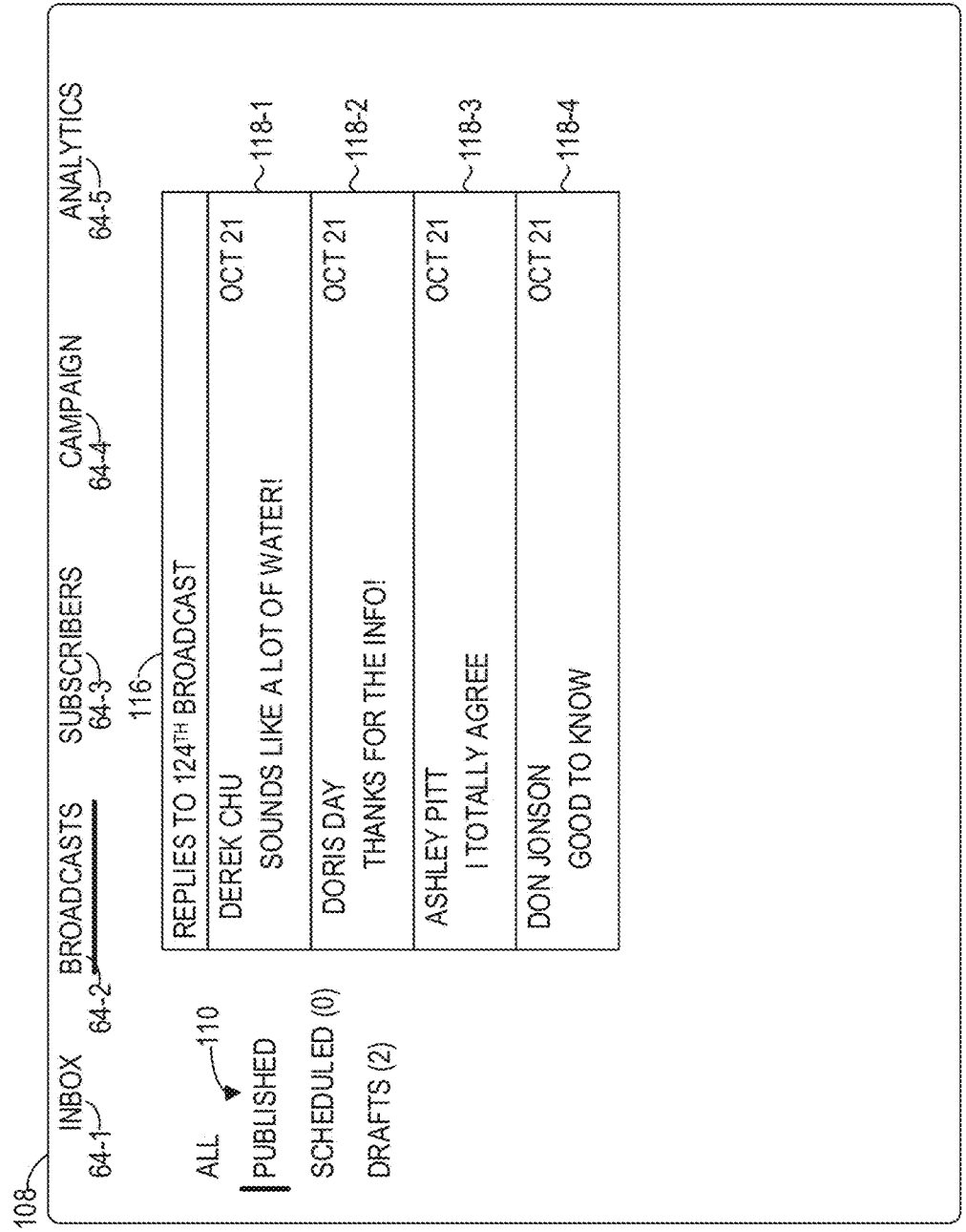
FIG. 6B illustrates user interface imagery that identifies the reply SMS messages received from subscribers in response to a particular published broadcast message.

Referring now to FIG. 6B, in response to the selection of the entry 114-1, the computing device 50 presents a broadcast message replies window 116 that comprises a plurality of entries 118-1-118-4, each of which identifies an SMS reply message from a subscriber 26 to a particular broadcast message from the host 24-1. Selection of an entry 118 by the host 24-1 will cause the computing device 50 to generate a subscriber communications window, similar to the subscriber communications window 90 illustrated in FIG. 4B, that presents, in chronological order, the communications between the host 24-1 and the particular subscriber 26. The host 24-1 can then, as illustrated in FIG. 4B, send a subscriber message to that particular subscriber 26 without sending the message to any other subscriber 26.

Figure 7:
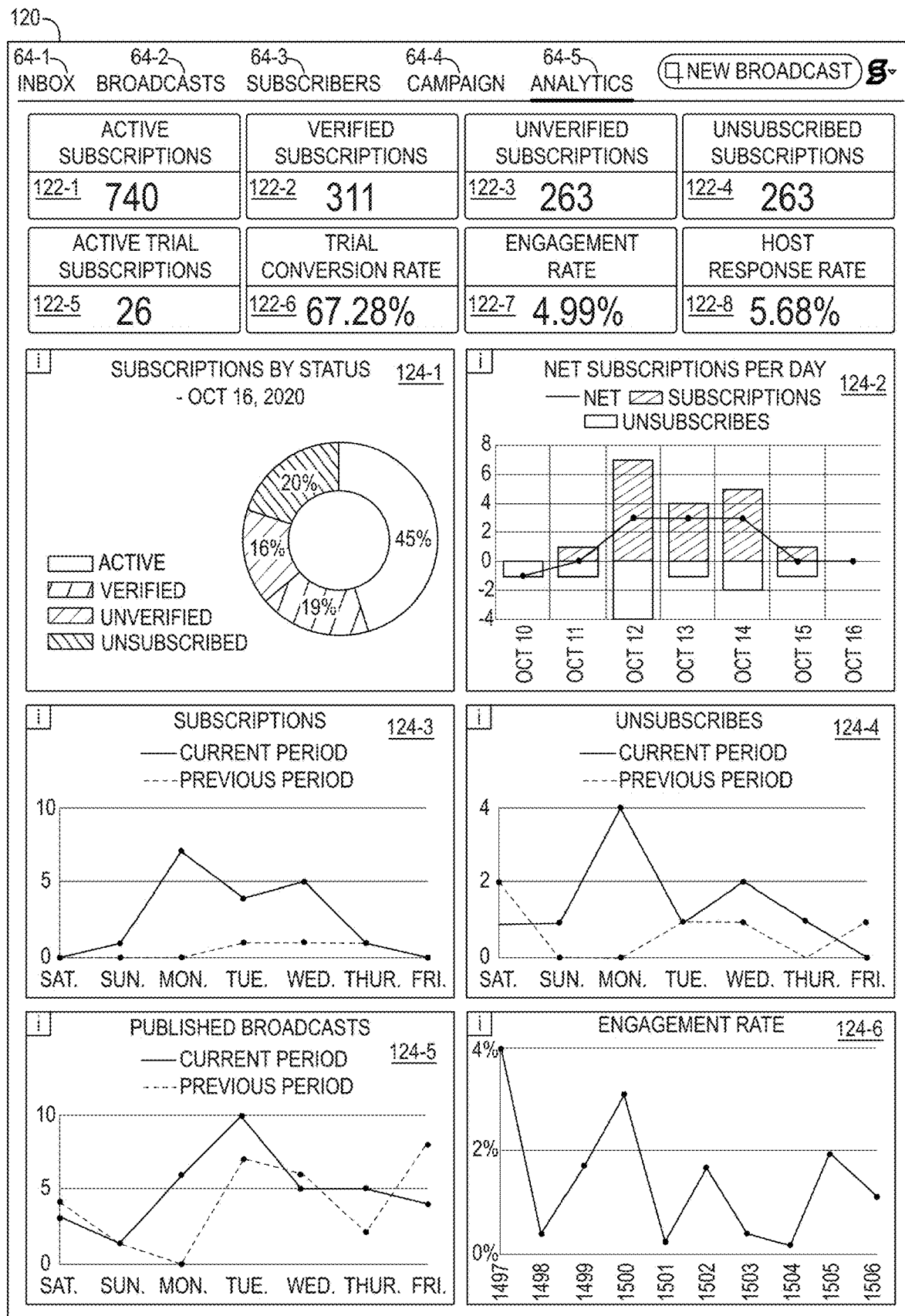
FIG. 7 illustrates user interface imagery that may be utilized by the host to view analytics associated with the subscription content source.

FIG. 7 illustrates user interface imagery 120 that may be utilized by the host 24-1 to view analytics associated with the subscription content source 22-1. In this example, the host 24-1 has selected the analytics tab 64-5 in order to view the analytics associated with the subscription content source 22-1. In response, the computing device 50 presents analytics metrics 122-1-122-8. The analytics metric 122-1 identifies the number of active subscriptions. The analytics metric 122-2 identifies the number of verified subscriptions, wherein a verified subscription is a subscription wherein the subscriber has verified a phone number via a code sent to the subscriber during the subscription process. The analytics metric 122-3 identifies the number of unverified subscriptions. The analytics metric 122-4 identifies the number of unsubscribed subscriptions. An unsubscribed subscription is a subscription where the subscriber has either actively requested to be unsubscribed, such as by sending a reply SMS message of "STOP", or has failed to update a payment mechanism, such as a credit card. The analytics metric 122-5 identifies the number of active trial subscriptions to the subscription content source 22-1. The analytics metric 122-6 identifies the number of trial subscriptions that converted to paid subscriptions. The analytics metric 122-7 identifies the number of different subscriptions for which a reply SMS message has been received or, in this example, a percentage of a total number of the plurality of subscriptions for which a reply SMS message has been received. The analytics metric 122-8 identifies a host response rate that identifies a percentage of subscriber reply messages to which the host 24-1 has responded.

The user interface imagery 120 also includes a plurality of analytics charts 124-1-124-6. The analytics chart 124-1 identifies the percentages of different subscription statuses of the subscriptions to the subscription content source 22-1. The analytics chart 124-2 is graph that illustrates net subscriptions per day. The analytics chart 124-3 is graph that illustrates subscriptions per day. The analytics chart 124-4 is graph that illustrates unsubscribes per day. The analytics chart 124-5 is graph that illustrates the number of broadcast messages sent per day. The analytics chart 124-6 is graph that illustrates the percentage of subscribers who received a broadcast and sent a reply SMS message to the host.

Figure 8A:
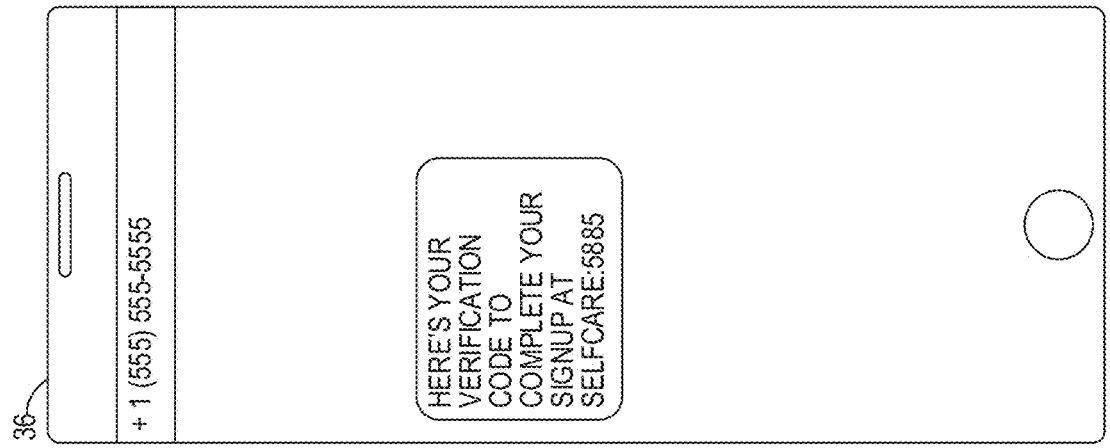
Figure 8B:
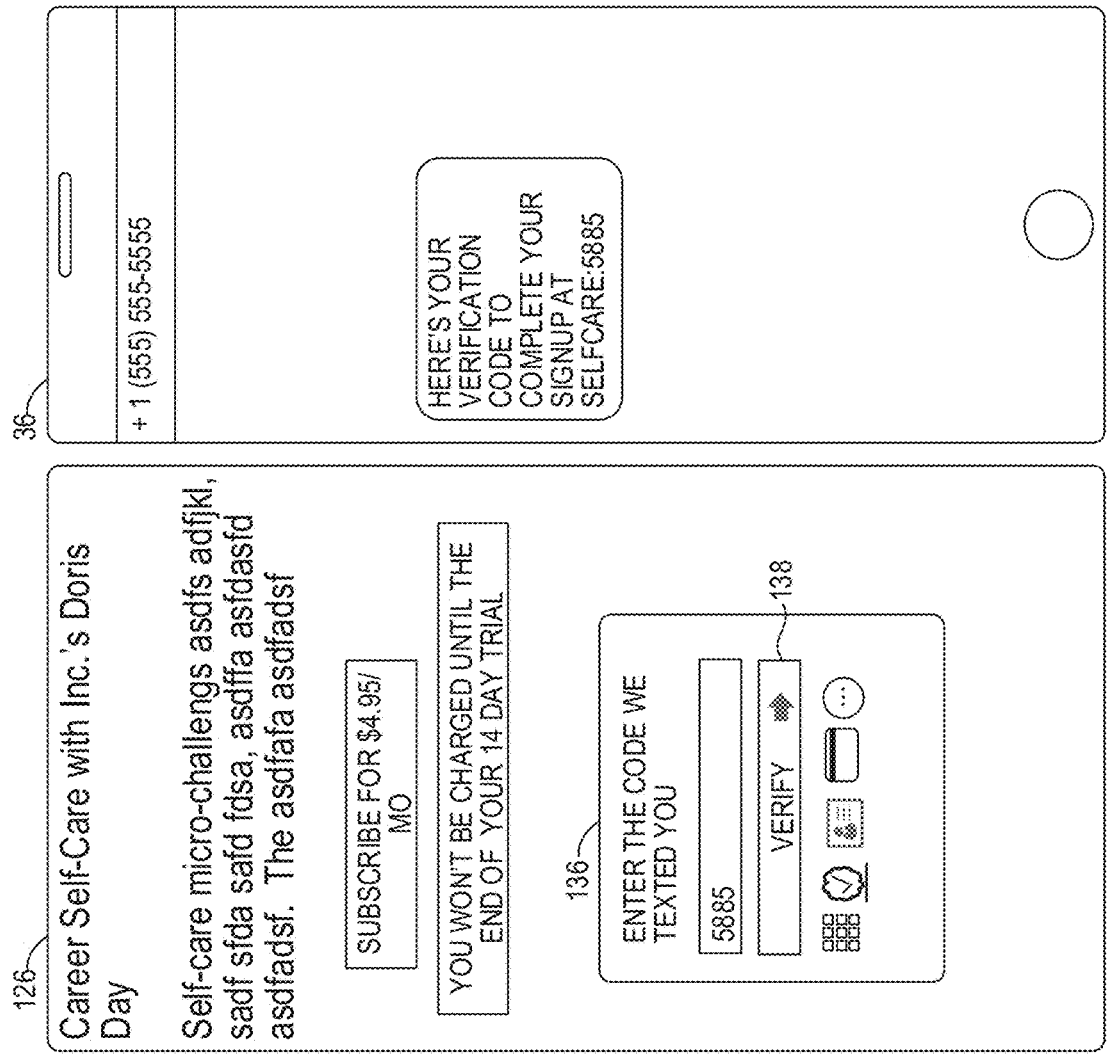
Figure 8C:
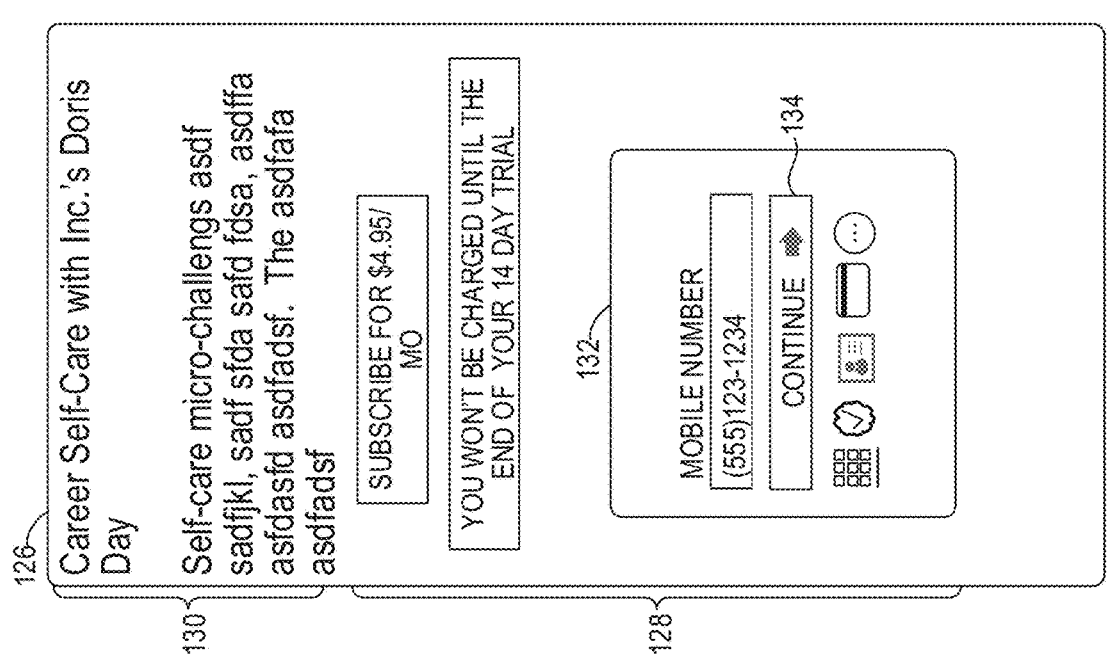

In some embodiments, the SMS-based dual mode content subscription system includes a subscriber web page module that can be incorporated into a web page or pages of a web site. The subscriber web page module can present user interface imagery that provides a reader with an easy and intuitive interface for becoming a subscriber to a particular subscription content source 22. The subscriber web page module may present such imagery in conjunction with other content presented on a web page, such as an article or the like. FIG. 8A illustrates a web page 126 and user interface imagery 128 implemented by a subscriber web page module of the SMS-based dual mode content subscription system according to one embodiment. The web page 126 includes content 130 and the user interface imagery 128 that provides information to a potential subscriber. The user interface imagery 128 includes a window 132 via which a potential subscriber can provide the telephone number of their subscriber device. The potential subscriber may provide their telephone number, and then select a continue control 134. Referring now to FIG. 8B, in response, the subscriber web page module presents a window 136 that requests a verification code that has been sent to the telephone number provided in FIG. 8A. The potential subscriber may enter the verification code that the potential subscriber received on their mobile device, and select a verify control 138. Referring now to FIG. 8C, the mobile device 36 of the potential subscriber is illustrated, showing the verification code that the communication platform 20 sent.

Figures 8D, 8E:
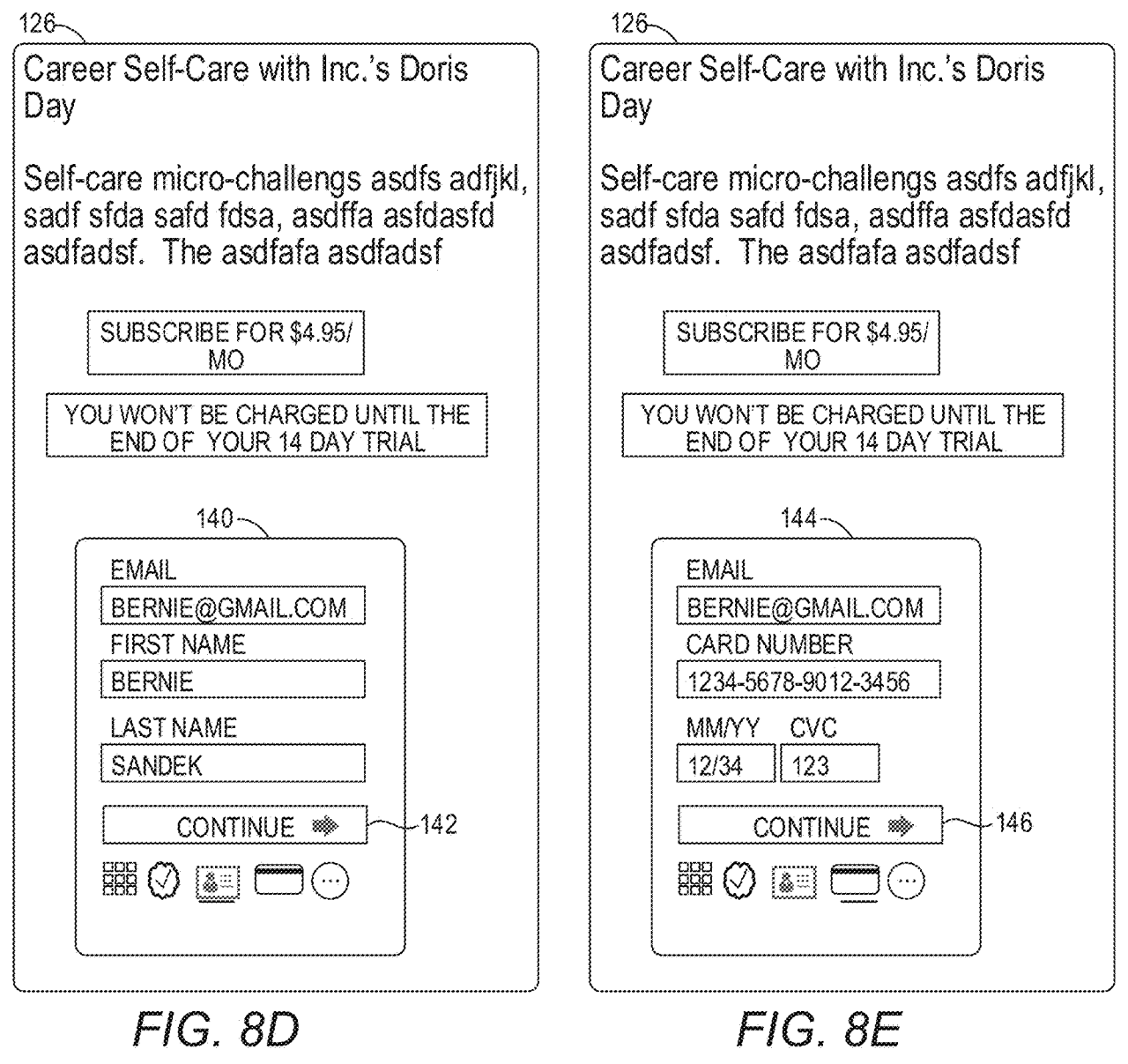

Referring now to FIG. 8D, in response to the potential subscriber providing the verification code and selecting the verify control 138, the subscriber web page module presents a window 140 that requests information about the potential subscriber, such as the name of the potential subscriber and an email address of the potential subscriber. The potential subscriber may enter the requested information and then select a continue control 142. Referring now to FIG. 8E, in response to the potential subscriber selecting the continue control 142, the subscriber web page module presents a window 144 that requests credit card information. The potential subscriber may enter the requested information and then select a continue control 146. The credit card information may be sent to the subscription validation service 39 for payment validation. If the subscription validation service 39 validates the credit card information, the subscription validation service 39 sends a new subscription message to the communication platform 20 indicating that a new subscription has been validated, the new subscription message including the phone number of the validated subscriber. The communication platform 20 then adds a new subscriber record 30 to the subscription content source 22-1 that identifies the new subscriber.

Figure 8G:
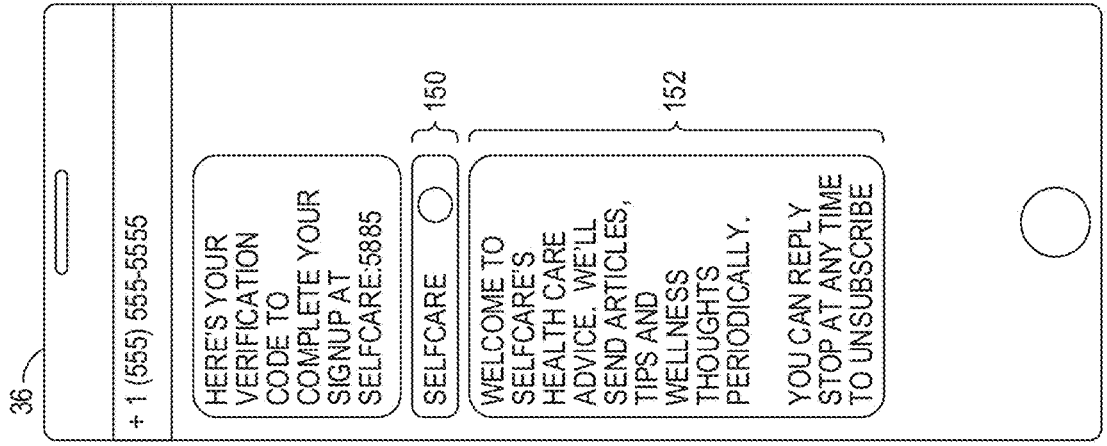
Figure 8F:
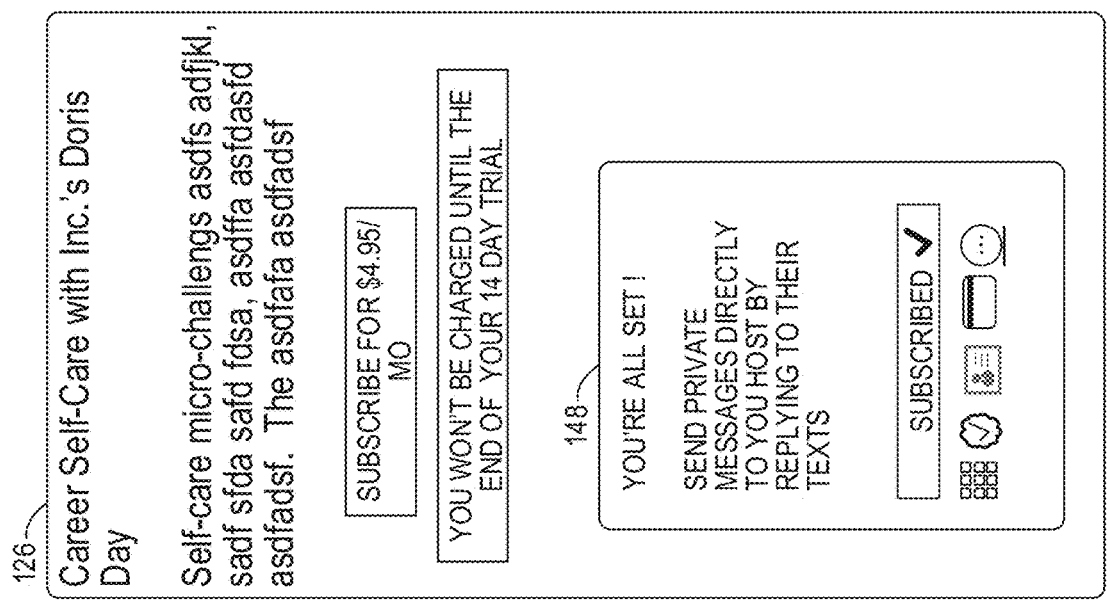

Referring now to FIG. 8F, in response to the successful validation by the subscription validation service 39, the subscriber web page module presents a window 148 that informs the potential subscriber that they have successfully subscribed to the subscription content source 22-1.

FIG. 8G illustrates the mobile device 36 of the potential subscriber after successful validation. The communication platform 20, in response to the successful validation, caused the SMS service 44 to send the mobile device 36 a vcard 150 associated with the subscription content source 22-1. The new subscriber can open the vcard 150, save the vcard 150, and subsequent SMS messages from the host 24-1 will be identified as coming from the contact identified in the vcard 150. The communication platform 20 also caused the SMS service 44 to send the mobile device 36 an SMS message 152 that informs the subscriber that they have successfully subscribed, and that they can unsubscribe by sending a reply SMS message of STOP. If the subscriber subsequently sends a reply SMS message of STOP, the communication platform 20 designates the subscriber as being unsubscribed, and removes the telephone number of the mobile device 36 as a destination SMS address.

Figure 9:
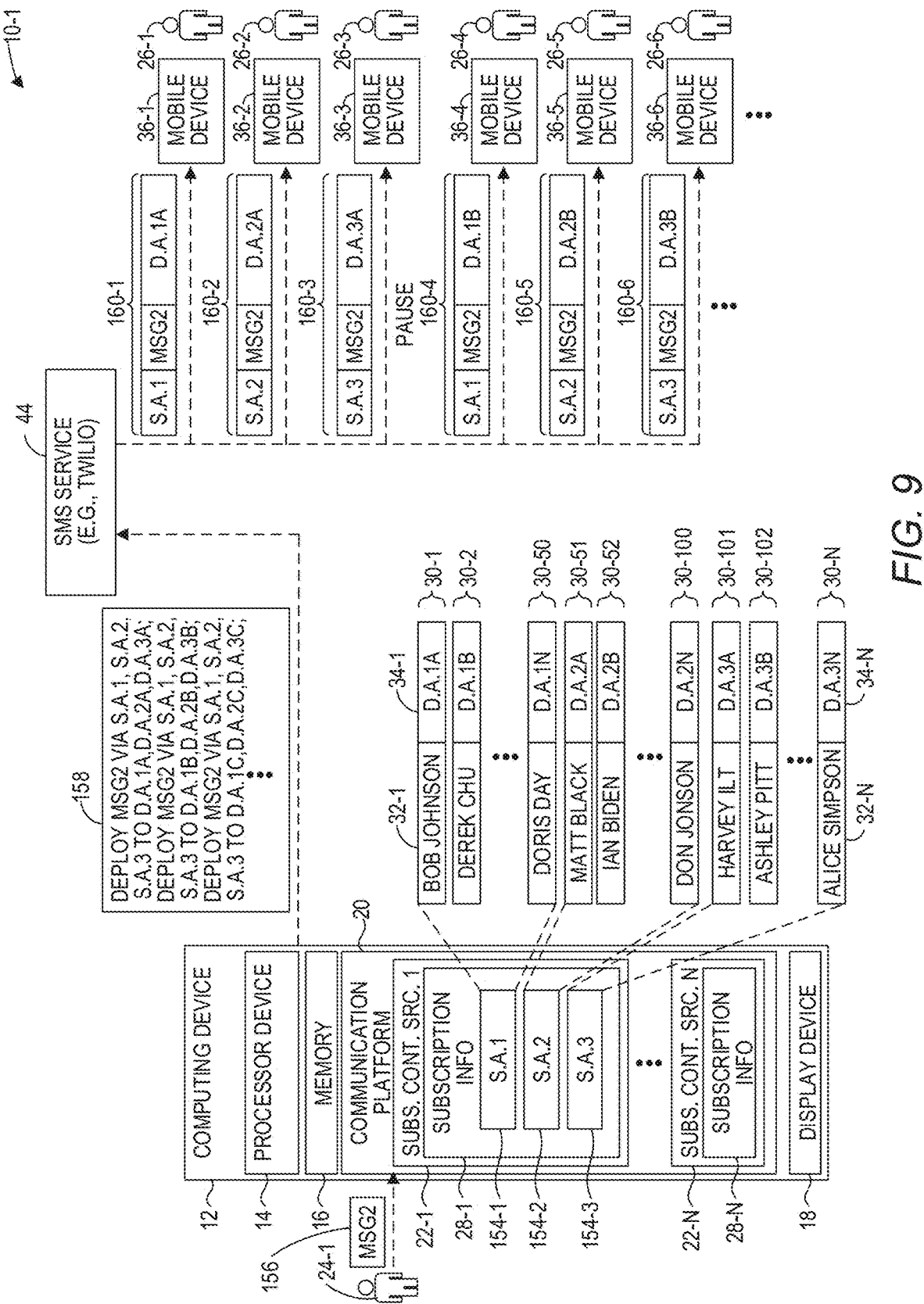
FIG. 9 is a block diagram of the SMS-based dual mode content subscription system illustrated in FIG. 1 according to another embodiment.

FIG. 9 is a block diagram of an environment 10-1 according to another embodiment. The environment 10-1 is substantially similar to the environment 10 discussed above with regard to FIGS. 1A-1C except as discussed herein. Due solely to space limitations certain components, such as the cellular networks 42 and the subscription validation service 39, have been omitted from FIG. 9, but in practice, such components may be utilized in FIG. 9 as discussed above with regard to FIGS. 1A-1C.

Many service providers (e.g., carriers) limit the rate at which an SMS message may be sent from a phone number. The limit may be, for example, one SMS message per second. If a subscription content source 22 grows to a large number of subscribers 26, such as 10,000 subscribers 26, and a single sender SMS address is used to send SMS broadcast messages, it would take almost three hours to send the SMS broadcast message to each such subscriber 26 due to this limitation. The environment 10-1 addresses this limitation. In this embodiment, the communication platform 20 has a plurality of sender SMS addresses 154-1-154-3 associated with the subscription content source 22-1. Each subscriber 26 may be assigned to a particular sender SMS address 154-1, 154-2 or 154-3. Thus, each sender SMS address 154-1, 154-2 or 154-3 may be used to send SMS messages to a particular set of destination SMS addresses, in particular, to those destination SMS addresses that have been assigned to the respective sender SMS address 154-1, 154-2 or 154-3.

Assume for purposes of illustration that the host 24-1 desires to send a broadcast message to the subscribers 26 who subscribe to the subscription content source 22-1. The communication platform 20 receives a broadcast message 156 (MSG2) from the host 24-1 as discussed above with regard to FIG. 1. In this embodiment, the communication platform 20 generates instructions 158 that cause the SMS message that includes the broadcast message 156 to be sent in groups via the at least one cellular network 42 (FIG. 1), wherein each group contains a single destination SMS address from each different set of destination SMS addresses, wherein each different set of destination SMS addresses corresponds to a different sender SMS address 154-1, 154-2 or 154-3. As an example, the instructions 158 "DEPLOY MSG2 VIA S.A.1, S.A.2, S.A.3 TO D.A.1A, D.A.2A,D.A.3A;" instruct the SMS service 44 to send an SMS message containing the broadcast message 156 to the destination SMS address D.A.1A (Bob Johnson) via the sender SMS address 154-1 (S.A.1), to the destination SMS address D.A.2A (Matt Black) via the sender SMS address 154-2 (S.A.2), and to the destination SMS address D.A.3A (Harvey Ilt) via the sender SMS address 154-3 (S.A.3). The subsequent instructions "DEPLOY MSG2 VIA S.A.1, S.A.2, S.A.3 TO D.A.1 B,D.A.2B,D.A.3B;" instruct the SMS service 44 to send an SMS message containing the broadcast message 156 to the destination SMS address D.A.1 B (Derek Chu) via the sender SMS address 154-1 (S.A.1), to the destination SMS address D.A.2B (Ian Biden) via the sender SMS address 154-2 (S.A.2), and to the destination SMS address D.A.3B (Ashley Pitt) via the sender SMS address 154-3 (S.A.3).

Upon receipt of the instructions 158, the SMS service 44 generates and sends SMS messages 160-1, 160-2 and 160-3 concurrently, or substantially concurrently, and in parallel, to mobile device 36-1 (D.A.1A) using sender SMS address 154-1 (S.A.1), to mobile device 36-2 (D.A.2A) using sender SMS address 154-2 (S.A.2), and to mobile device 36-3 (D.A.3A) using sender SMS address 154-3 (S.A.3). The SMS service 44 may then pause for a predetermined time sufficient not to violate a carrier's SMS message rate limit. The SMS service 44 then sends SMS messages 160-4, 160-5 and 160-6 concurrently, or substantially concurrently, and in parallel, to mobile device 36-4 (D.A.1B) using sender SMS address 154-1 (S.A.1), to mobile device 36-5 (D.A.2B) using sender SMS address 154-2 (S.A.2), and to mobile device 36-6 (D.A.3B) using sender SMS address 154-3 (S.A.3).

The SMS service 44 repeats this process until an SMS message 160 has been sent to each mobile device 36 that corresponds to a subscriber 26 of the subscription content source 22-1. In this manner, in the example of 10,000 subscribers 26, the amount of time to send the SMS message would be decreased from 166 minutes to 55 minutes. While for purposes of illustration only three sender SMS addresses were used in this example, there is no limit to the number of sender SMS addresses that may be used, such as 10, 50, 100 or any other number of sender SMS addresses.

Figure 10:
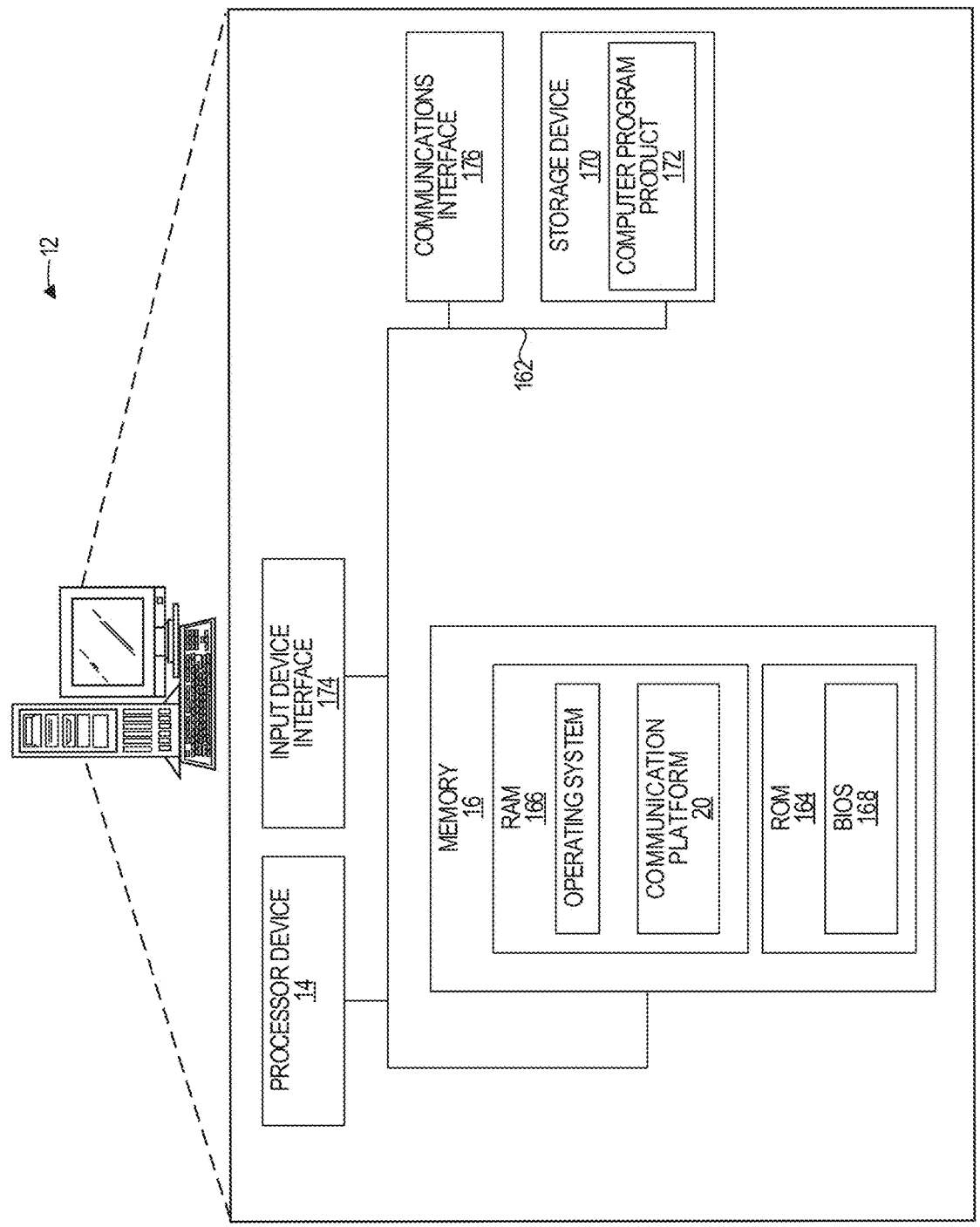
FIG. 10 is a block diagram of a computing system capable of implementing the embodiments.

FIG. 10 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 162. The system bus 162 provides an interface for system components including, but not limited to, the system memory 16 and the processor device 14. The processor device 14 can be any commercially available or proprietary processor.

The system bus 162 may be any of several types of bus structures that may further interconnect to a memory bus (with or without a memory controller), a peripheral bus, and/or a local bus using any of a variety of commercially available bus architectures. The system memory 16 may include non-volatile memory 164 (e.g., read-only memory (ROM), erasable programmable read-only memory (EPROM), electrically erasable programmable read-only memory (EEPROM), etc.), and volatile memory 166 (e.g., random-access memory (RAM)). A basic input/output system (BIOS) 168 may be stored in the non-volatile memory 164 and can include the basic routines that help to transfer information between elements within the computing device 12. The volatile memory 166 may also include a high-speed RAM, such as static RAM, for caching data.

The computing device 12 may further include or be coupled to a non-transitory computer-readable storage medium such as a storage device 170, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 170 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 170 and in the volatile memory 166, including an operating system and one or more program modules, such as the communication platform 20, which may implement the functionality described herein in whole or in part.

All or a portion of the examples may be implemented as a computer program product 172 stored on a transitory or non-transitory computer-usable or computer-readable storage medium, such as the storage device 170, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the communication platform 20 in the volatile memory 166, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as the display device 18. Such input devices may be connected to the processor device 14 through an input device interface 174 that is coupled to the system bus 162 but can be connected by other interfaces such as a parallel port, an Institute of Electrical and Electronic Engineers (IEEE) 1394 serial port, a Universal Serial Bus (USB) port, an IR interface, and the like.

The computing device 12 may also include one or more communications interfaces 176, such as Ethernet transceiver, suitable for communicating with other components discussed herein as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing device, a first broadcast message associated with a first subscription content source of a plurality of subscription content sources;
   determining, by the computing device, a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;
   causing, by the computing device, a first SMS message that includes the first broadcast message to be sent via at least one cellular network to each destination SMS address in the first set of destination SMS addresses, the first SMS message identifying a same first sender SMS address;
   receiving, from a first mobile device of the plurality of mobile devices, a reply SMS message made in response to the first SMS message received by the first mobile device, the reply SMS message being directed to the first sender SMS address and not being distributed to any other mobile device of the plurality of mobile devices;
   presenting, on a display device, a subscriber communications window that presents the reply SMS message and previous communications between a host of the first subscription content source and the first mobile device;
   receiving, via the subscriber communications window, a first subscriber message; and
   in response to the reply SMS message, causing, by the computing device, a second SMS message that includes the first subscriber message to be sent to only the first mobile device via the at least one cellular network.

2. The method of claim 1 further comprising:
   receiving a request to subscribe to the first subscription content source, the request identifying a new SMS address of a new mobile device; and
   adding, to the first set of destination SMS addresses, the new SMS address of the new mobile device.

3. The method of claim 1 further comprising:
   receiving, by the computing device, a second broadcast message associated with the first subscription content source;
   determining, by the computing device, the first set of destination SMS addresses from the plurality of destination SMS addresses; and
   causing, by the computing device, a third SMS message that includes the second broadcast message to be sent via the at least one cellular network to each destination SMS address in the first set of SMS addresses including the new destination SMS address, each third SMS message identifying the same sender SMS address.

4. The method of claim 1 further comprising:
   determining, by the computing device, a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices; and
   wherein causing, by the computing device, the first SMS message that includes the first broadcast message to be sent via the at least one cellular network to each destination SMS address in the first set of destination SMS addresses further comprises:
      causing, by the computing device, the first SMS message to be sent in groups via the at least one cellular network, each group comprising only one destination SMS address from the first set of destination SMS addresses and only one destination SMS address from the second set of destination SMS addresses, wherein the one destination SMS address from the first set of destination SMS addresses is sent via the first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses.

5. A computing system, comprising:
   one or more memories; and
   one or more processor devices coupled to the one or more memories, the one or more processor devices configured to:
      receive a first broadcast message associated with a first subscription content source of a plurality of subscription content sources;
      determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;
      cause a first SMS message that includes the first broadcast message to be sent via at least one cellular network to each destination SMS address in the first set of destination SMS addresses, the first SMS message identifying a same first sender SMS address;
      receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices;
      present, on a display device, a subscriber communications window that presents the reply SMS message and previous communications between a host of the first subscription content source and the first mobile device;
      receive, via the subscriber communications window, a first subscriber message; and
      in response to the reply SMS message, cause a second SMS message that includes the first subscriber message to be sent to only the first mobile device via the at least one cellular network.

6. The computing system of claim 5 wherein the one or more processor devices are further configured to:
   determine a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices; and
   wherein to cause the first SMS message that includes the first broadcast message to be sent via the at least one cellular network to each destination SMS address in the first set of destination SMS addresses, the one or more processor devices are further configured to:
      cause the first SMS message to be sent in groups via the at least one cellular network, each group comprising only one destination SMS address from the first set of destination SMS addresses and only one destination SMS address from the second set of destination SMS addresses, wherein the one destination SMS address from the first set of destination SMS addresses is sent via the first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses.

7. A computer program product stored on a non-transitory computer-readable storage medium and including instructions configured to cause one or more processor devices to:
   receive a first broadcast message associated with a first subscription content source of a plurality of subscription content sources;
   determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;
   cause a first SMS message that includes the first broadcast message to be sent via at least one cellular network to each destination SMS address in the first set of destination SMS addresses, the first SMS message identifying a same first sender SMS address;
   receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices;
   present, on a display device, a subscriber communications window that presents the reply SMS message and previous communications between a host of the first subscription content source and the first mobile device;
   receive, via the subscriber communications window, a first subscriber message; and
   in response to the reply SMS message, cause a second SMS message that includes the first subscriber message to be sent to only the first mobile device via the at least one cellular network.

8. The computer program product of claim 7 wherein the instructions are further configured to cause the one or more processor devices to:
  determine a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices; and
  wherein to cause the first SMS message that includes the first broadcast message to be sent via the at least one cellular network to each destination SMS address in the first set of destination SMS addresses, the one or more processor devices are further configured to:
    cause the first SMS message to be sent in groups via the at least one cellular network, each group comprising only one destination SMS address from the first set of destination SMS addresses and only one destination SMS address from the second set of destination SMS addresses, wherein the one destination SMS address from the first set of destination SMS addresses is sent via the first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses.

9. A method comprising:
  receiving, by a computing device, a first broadcast message associated with a first subscription content source of a plurality of subscription content sources;
  determining, by the computing device, a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;
  determining, by the computing device, a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices;
  causing, by the computing device, a first SMS message to be sent in groups via at least one cellular network, each group comprising only one destination SMS address from the first set of destination SMS addresses and only one destination SMS address from the second set of destination SMS addresses, wherein the one destination SMS address from the first set of destination SMS addresses is sent via first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses;
  receiving, from a first mobile device of the plurality of mobile devices, a reply SMS message made in response to the first SMS message received by the first mobile device, the reply SMS message being directed to the first sender SMS address and not being distributed to any other mobile device of the plurality of mobile devices; and
  in response to the reply SMS message, causing, by the computing device, a second SMS message that includes a first subscriber message to be sent to only the first mobile device via the at least one cellular network.

10. A computing system, comprising:
  one or more memories; and
  one or more processor devices coupled to the one or more memories, the one or more processor devices configured to:
    receive a first broadcast message associated with a first subscription content source of a plurality of subscription content sources;
    determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;
    determine a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices;
    cause a first SMS message to be sent in groups via at least one cellular network, each group comprising only one destination SMS address from the first set of destination SMS addresses and only one destination SMS address from the second set of destination SMS addresses, wherein the one destination SMS address from the first set of destination SMS addresses is sent via a first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses;
    receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices; and
    in response to the reply SMS message, cause a second SMS message that includes a first subscriber message to be sent to only the first mobile device via the at least one cellular network.

11. A computer program product stored on a non-transitory computer-readable storage medium and including instructions configured to cause one or more processor devices to:
  receive a first broadcast message associated with a first subscription content source of a plurality of subscription content sources;
  determine a first set of destination SMS addresses from a plurality of destination SMS addresses, each destination SMS address in the first set of destination SMS addresses associated with a different subscription of a plurality of subscriptions to the first subscription content source and corresponding to a different mobile device of a plurality of mobile devices;

determine a second set of destination SMS addresses from the plurality of destination SMS addresses, each destination SMS address in the second set of destination SMS addresses associated with a different subscription of the plurality of subscriptions to the first subscription content source and corresponding to a different mobile device of the plurality of mobile devices;

cause a first SMS message to be sent in groups via at least one cellular network, each group comprising only one destination SMS address from the first set of destination SMS addresses and only one destination SMS address from the second set of destination SMS addresses, wherein the one destination SMS address from the first set of destination SMS addresses is sent via a first sender SMS address and the one destination SMS address from the second set of destination SMS addresses is sent via a second sender SMS address, until the first SMS message has been sent to each destination SMS address in the first set of destination SMS addresses and each destination SMS address in the second set of destination SMS addresses;

receive, from a first mobile device of the plurality of mobile devices, a reply SMS message made in response to the first SMS message received by the first mobile device, the reply SMS message being directed to the first sender SMS address and not being distributed to any other mobile device of the plurality of mobile devices; and in response to the reply SMS message, cause a second SMS message that includes a first subscriber message to be sent to only the first mobile device via the at least one cellular network.

* * * * *